(12) United States Patent
Fukui

(10) Patent No.: US 10,949,712 B2
(45) Date of Patent: Mar. 16, 2021

(54) INFORMATION PROCESSING METHOD AND INFORMATION PROCESSING DEVICE

(71) Applicant: SONY CORPORATION, Tokyo (JP)

(72) Inventor: Akira Fukui, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 16/068,794

(22) PCT Filed: Dec. 27, 2016

(86) PCT No.: PCT/JP2016/088890
§ 371 (c)(1),
(2) Date: Jul. 9, 2018

(87) PCT Pub. No.: WO2017/168899
PCT Pub. Date: Oct. 5, 2017

(65) Prior Publication Data
US 2019/0019062 A1  Jan. 17, 2019

(30) Foreign Application Priority Data

Mar. 30, 2016 (JP) .............................. JP2016-068929

(51) Int. Cl.
*G06K 9/62* (2006.01)
*G01C 21/26* (2006.01)
(Continued)

(52) U.S. Cl.
CPC ........... *G06K 9/6232* (2013.01); *G01C 21/26* (2013.01); *G01C 21/32* (2013.01);
(Continued)

(58) Field of Classification Search
CPC combination set(s) only.
See application file for complete search history.

(56) References Cited

U.S. PATENT DOCUMENTS 8,116,558 B2 * 2/2012 Hayashi ............... G01B 11/24
382/154
8,195,394 B1 * 6/2012 Zhu ....................... G01C 21/26
701/514
(Continued)

FOREIGN PATENT DOCUMENTS

WO    WO 2005/038402 A1    4/2005

OTHER PUBLICATIONS

Peng et al., 3D Reconstruction Based on SIFT and Harris Feature Points, International Conference on Robotics and Biomimetics, Dec. 19-23, 2009, pp. 960-964, IEEE, Guilin, China.
(Continued)

*Primary Examiner* — Tsung Yin Tsai
(74) *Attorney, Agent, or Firm* — Paratus Law Group, PLLC

(57) ABSTRACT

There is provided an information processing method and an information processing device to provide positional information with higher accuracy in accordance with situations in the real world. The information processing method includes: generating, by a processor, a feature point list in which three-dimensional coordinates of a feature point are associated with a local feature amount of the feature point, the feature point having been detected from observation information collected around a unit area. The information processing device includes: a computation section configured to extract a feature point and a local feature amount related to the feature point from acquired image information; and a communication section configured to acquire a feature point list on a basis of collected observation information.

18 Claims, 18 Drawing Sheets

(51) Int. Cl.
   *G06K 9/46*    (2006.01)
   *G06T 7/73*    (2017.01)
   *G06T 7/246*   (2017.01)
   *G06K 9/00*    (2006.01)
   *G01C 21/32*   (2006.01)
   *G06T 19/00*   (2011.01)

(52) U.S. Cl.
   CPC ..... *G06K 9/00791* (2013.01); *G06K 9/00805* (2013.01); *G06K 9/00825* (2013.01); *G06K 9/4604* (2013.01); *G06K 9/623* (2013.01); *G06T 7/246* (2017.01); *G06T 7/73* (2017.01); *G06T 19/006* (2013.01); *G06T 2207/10016* (2013.01); *G06T 2207/10024* (2013.01); *G06T 2207/30244* (2013.01); *G06T 2207/30252* (2013.01)

(56) References Cited

U.S. PATENT DOCUMENTS

| | | | | |
|---|---|---|---|---|
| 8,818,016 | B2* | 8/2014 | Choi | G06K 9/00664 |
| | | | | 382/100 |
| 9,612,123 | B1* | 4/2017 | Levinson | B60W 30/09 |
| 2008/0144925 | A1* | 6/2008 | Zhu | G06K 9/32 |
| | | | | 382/154 |
| 2010/0329513 | A1* | 12/2010 | Klefenz | G06K 9/00805 |
| | | | | 382/104 |
| 2011/0044504 | A1* | 2/2011 | Oi | G06T 7/73 |
| | | | | 382/103 |
| 2012/0162425 | A1* | 6/2012 | Choi | G06T 5/003 |
| | | | | 348/148 |
| 2012/0195471 | A1* | 8/2012 | Newcombe | G06T 7/194 |
| | | | | 382/106 |
| 2015/0210278 | A1* | 7/2015 | Ben Shalom | B60W 10/20 |
| | | | | 382/104 |
| 2015/0254819 | A1* | 9/2015 | Hara | G06T 5/006 |
| | | | | 345/647 |
| 2016/0238394 | A1* | 8/2016 | Iimura | G06T 1/0014 |
| 2017/0123421 | A1* | 5/2017 | Kentley | G08G 1/202 |
| 2017/0124476 | A1* | 5/2017 | Levinson | G01S 17/86 |
| 2017/0132934 | A1* | 5/2017 | Kentley | G08G 1/202 |
| 2019/0088011 | A1* | 3/2019 | Liu | G06T 17/05 |
| 2019/0147250 | A1* | 5/2019 | Zhang | G06T 3/0031 |
| | | | | 382/224 |

OTHER PUBLICATIONS

Chen et al., Invariant matching method for different viewpoint angle images, Applied Optics, Jan. 1, 2013, pp. 96-104, vol. 52, No. 1.

* cited by examiner

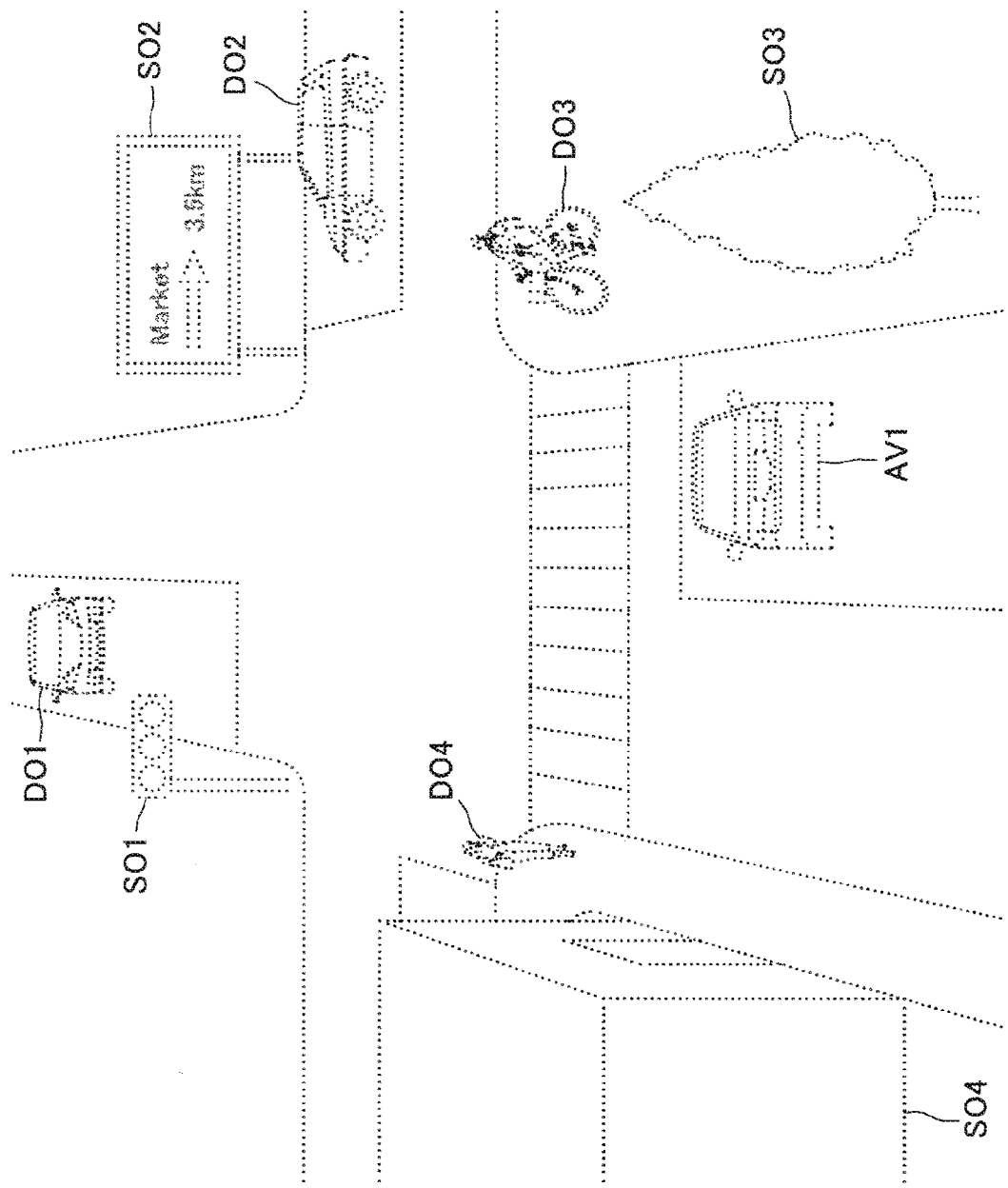

FIG. 9

| UNIT AREA COORDINATES | ID | FEATURE POINT COORDINATES | FEATURE AMOUNT VECTOR |
|---|---|---|---|
| (X,Y,Z) | p1 | (x1,y1,z1) | VECTOR 1 |
| (X,Y,Z) | p2 | (x2,y2,z2) | VECTOR 2 |
| (X,Y,Z) | p3 | (x3,y3,z3) | VECTOR 3 |

INFORMATION PROCESSING METHOD AND INFORMATION PROCESSING DEVICE

CROSS REFERENCE TO PRIOR APPLICATION

This application is a National Stage Patent Application of PCT International Patent Application No. PCT/JP2016/088890 (filed on Dec. 27, 2016) under 35 U.S.C. § 371, which claims priority to Japanese Patent Application No. 2016-068929 (filed on Mar. 30, 2016), which are all hereby incorporated by reference in their entirety.

TECHNICAL FIELD

The present disclosure relates to an information processing method and an information processing device.

BACKGROUND ART

In recent years, various kinds of services using map information have been proposed. In addition, methods for generating three-dimensional maps on the basis of information obtained through observation in a real world, have also been proposed. Examples of such a device using the three-dimensional map include a navigation device described in Patent Literature 1.

CITATION LIST

Patent Literature

Patent Literature 1: WO 2005/038402

DISCLOSURE OF INVENTION

Technical Problem

However, the three-dimensional maps described in Patent Literature 1 are not generated in view of environments in the real world sufficiently. Therefore, according to the situation, sometimes it is difficult to perform self-localization by using the three-dimensional map described Patent Literature 1.

Accordingly, the present disclosure proposes an information processing method and information processing device that are capable of providing positional information with higher accuracy in accordance with an environment in the real world.

Solution to Problem

According to the present disclosure, there is provided an information processing method including generating, by a processor, a feature point list in which three-dimensional coordinates of a feature point are associated with a local feature amount of the feature point, the feature point having been detected from observation information collected around a unit area.

In addition, according to the present disclosure, there is provided an information processing device including: a computation section configured to extract a feature point and a local feature amount related to the feature point from acquired image information; and a communication section configured to acquire a feature point list on a basis of collected observation information. The computation section performs self-localization on a basis of the local feature amount and the feature point list. The feature point list includes the local feature amount related to the feature point and a three-dimensional coordinate position of the feature point associated with a unit area including an observation point of the observation information.

In addition, according to the present disclosure, there is provided an information processing device including: a communication section configured to receive observation information collected around a unit area; and a list generation section configured to generate a feature point list in which three-dimensional coordinates of a feature point are associated with a local feature amount of the feature point, the feature point having been detected from the observation information.

Advantageous Effects of Invention

As described above, according to the present disclosure, it is possible to provide positional information with higher accuracy in accordance with an environment in the real world. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1B is an illustration diagram of an ambient environment recognized by the autonomous vehicle according to the present disclosure.

FIG. 9 is a data configuration example of the recommendation feature point list according to the embodiment.

MODE(S) FOR CARRYING OUT THE INVENTION

Figure 1A:
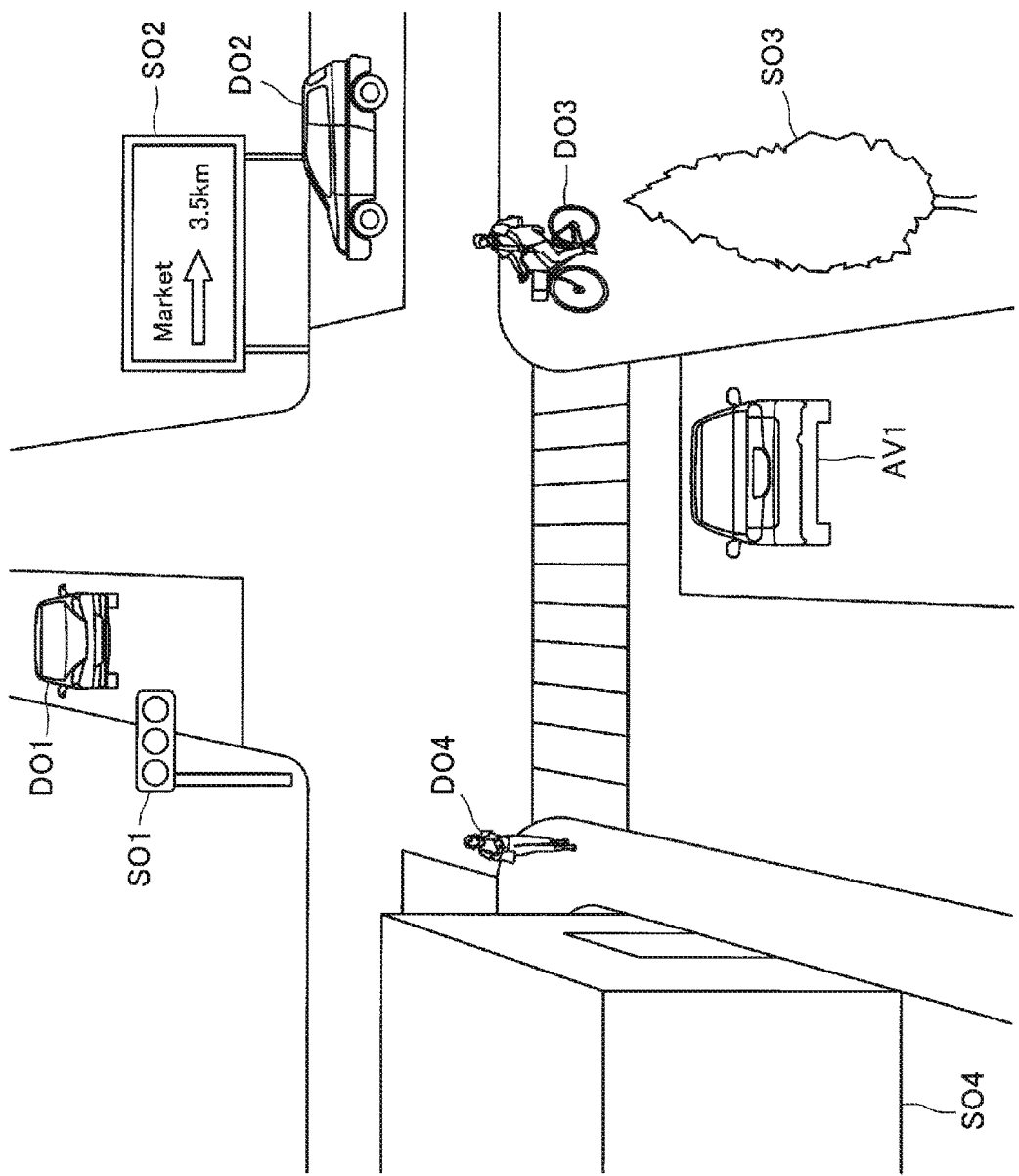
FIG. 1A is a diagram schematically illustrating an environment around an autonomous vehicle according to the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, the description is given in the following order.
1. Overview of present disclosure
1.1 Self-localization using feature point
1.2. Automated driving through feature point tracking
1.3. Reliability of feature point
2. Embodiment
2.1. System configuration example according to present embodiment
2.2 Information processing server 10
2.3. Information processing device 20
2.4. Overview of recommendation feature point list generation
2.5. Details of usage data selection
2.6. Details of three-dimensional map generation
2.7. Details of recommendation feature point list generation
2.8. Effect according to present embodiment
2.9. Self-localization of information processing device 20
3. Hardware configuration example
4. Conclusion <1. Overview of Present Disclosure>

<<1.1 Self-Localization Using Feature Point>>

In recent years, various kinds of devices using map information have been developed. Major examples of such devices include a navigation device. In general, the navigation device is capable of carrying out a function such as route navigation on the basis of coordinate information acquired via the GPS and map information held by itself.

However, it is difficult for the above-described navigation device to accurately recognize a current position in a place where GPS positioning cannot be conducted. In addition, it is difficult to receive signal especially in a room. Therefore, it is difficult to achieve its original function.

On the other hand, as a self-localization method, technologies such as simultaneous localization and mapping (SLAM) are known. The SLAM is a method of simultaneously performing self-localization and environmental map generation. When using the SLAM, it is possible to perform the self-localization and the environmental map generation by extracting a feature point from observation information acquired from a sensor such as a camera, and tracking the feature point.

However, it is known that, in the SLAM, selection of a feature point to be tracked heavily affects accuracy of the self-localization. For example, in the case of selecting a feature point related to a dynamic object that autonomously moves or a feature point which is easily confused with another object, this may cause accumulation of errors and it becomes difficult to correctly perform self-localization. Therefore, in the self-localization, it is important to select a feature point having high reliability. In other words, feature point information with high reliability is necessary for devices that perform self-localization or devices that perform control based on self-localization.

<<1.2. Automated Driving Through Feature Point Tracking>>

Here, a detailed example of the device that performs self-localization using feature points will be described. Examples of such a device include an autonomous vehicle. The autonomous vehicle is capable of recognizing an ambient environment from information acquired by various sensors, and achieving autonomous driving in accordance with the recognized environment. In this case, it is necessary to perform highly accurate self-localization to perform appropriate driving control.

FIG. 1A and FIG. 1B are diagrams illustrating recognition of an ambient environment by an autonomous vehicle. FIG. 1A is a diagram schematically illustrating an environment around an autonomous vehicle AV1 in a real world. With reference to FIG. 1A, there are dynamic objects DO1 to DO4 and static objects SO1 to SO4 around the autonomous vehicle AV1. Here, the dynamic objects DO1 to DO4 may be objects that dynamically move. In the example illustrated in FIG. 1A, the dynamic objects DO1 and DO2 are illustrated as vehicles, the dynamic object DO3 is illustrated as a bicycle, and the dynamic object DO4 is illustrated as a pedestrian. In addition, the static objects SO1 to SO4 may be objects that do not autonomously moves. In the example illustrated in FIG. 1A, the static object SO1 is illustrated as a traffic light, the static object SO2 is illustrated as a billboard, the static object SO3 is illustrated as a street tree, and the static object SO4 is illustrated as a building.

Next, with reference to FIG. 1B, an example of an ambient environment recognized by the autonomous vehicle AV1 will be described. FIG. 1B is a diagram schematically illustrating an ambient environment recognized by the autonomous vehicle AV1. As illustrated in FIG. 1B, for example, the autonomous vehicle AV1 is capable of recognizing an ambient environment by using feature points detected on the basis of observation information including image information. Therefore, in FIG. 1B, the dynamic objects DO1 to DO4 and the static objects SO1 to SO4 are represented by respective sets of feature points detected by the autonomous vehicle AV1. As described above, the autonomous vehicle AV1 is capable of recognizing its ambient environment by tracking feature points of objects detected on the basis of information obtained from a camera or the like mounted on the autonomous vehicle AV1.

However, in this case, there is a possibility that an estimated position is different from a real position if the autonomous vehicle AV1 performs self-localization on the basis of a feature point having low reliability. In this case, the autonomous vehicle AV1 cannot perform appropriate driving control, and possibly causes an accident. Therefore, highly accurate self-localization is required also in view of safety assurance.

<<1.3. Reliability of Feature Point>>

The detailed examples of self-localization using feature points and a device that performs the self-localization have been described above. The information processing method and information processing device according to the present disclosure have been made in view of the reliability of the feature points as described above. Therefore, it is possible to generate a recommendation feature point list based on the reliability of the feature points. In addition, the recommendation feature point list according to the present disclosure additionally includes local feature amounts of the feature points.

Here, reliability of feature points according to the present disclosure will be described. In the present disclosure, a feature point having high reliability may be a feature point observed from many observation points in a unit area. In other words, the feature point having high reliability according to the present disclosure may be a feature point with many observation experiences. Alternatively, the feature point having high reliability according to the present disclosure may be a feature point which is not easily confused with other feature points when minimizing a projection error or tracking the feature point (to be described later).

Figure 2:
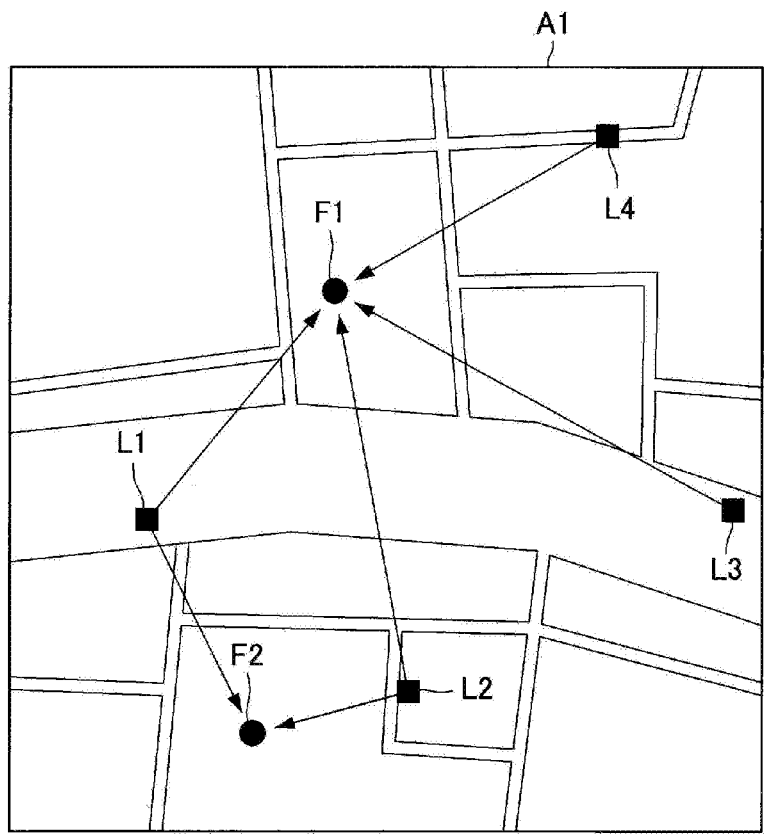
FIG. 2 is a conceptual diagram illustrating reliability of feature points according to the present disclosure.

FIG. 2 is a conceptual diagram illustrating reliability of feature points according to the present disclosure. FIG. 2 illustrates feature points F1, F2, and observation locations L1 to L4. The feature points F1 and F2 are observed in a unit area A1. Here, the arrows from the observation locations L1 to L4 to the feature point F1 or F2 mean that it is possible to observe the feature point F1 or F2 from the respective observation locations L1 to L4.

Therefore, in the example illustrated in FIG. 2, it is possible to observe both the feature point F and the feature point F2 from the observation locations L and L2, but it is possible to observe only the feature point F1 from the observation location L3 and L4. In this case, the feature point F1 has higher reliability than the feature point F2 in the present disclosure.

As described above, by using the information processing method according to the present disclosure, it is also possible to define a feature point which may be observed from many observation locations, as a feature point having high reliability.

Figure 3A:
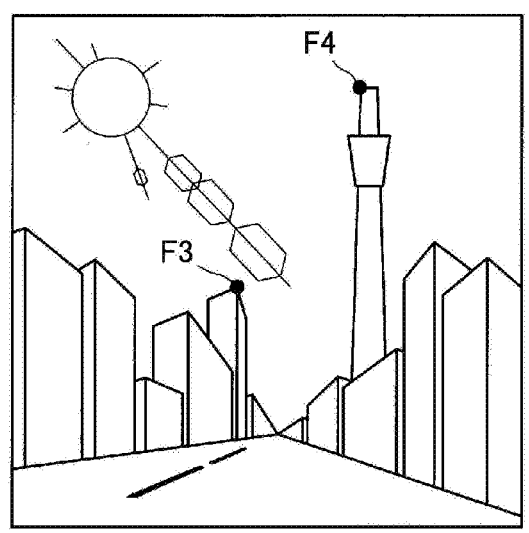
FIG. 3A is a diagram illustrating reliability of feature points affected by an environmental situation according to the present disclosure.
Figure 3B:
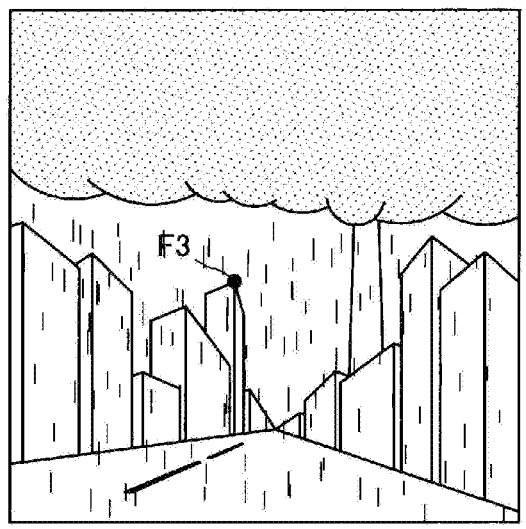
FIG. 3B is a diagram illustrating reliability of the feature points affected by an environmental situation according to the present disclosure.
Figure 3C:
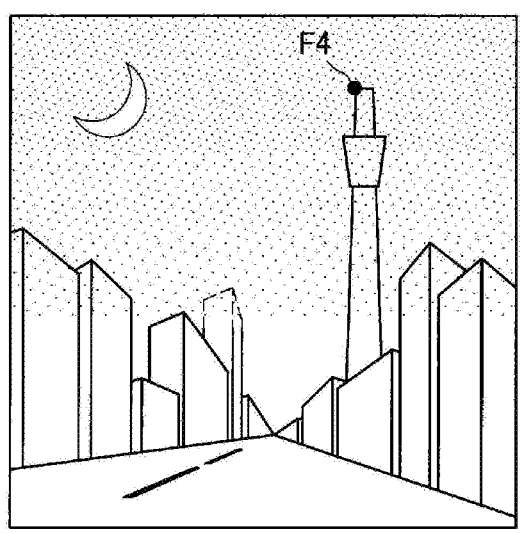
FIG. 3C is a diagram illustrating reliability of the feature points affected by an environmental situation according to the present disclosure.

On the other hand, reliability of a single feature point in a unit area may vary depending on environmental situations. FIG. 3A to FIG. 3C are diagrams illustrating reliability of feature points affected by environmental situations. Here, for example, FIG. 3A to FIG. 3C may be examples illustrating images acquired by a vehicle-mounted camera of an autonomous vehicle. In addition, FIG. 3A to FIG. 3C may be examples illustrating images captured from the same point of view at the same observation location.

FIG. 3A illustrates an example of an image captured in a clear and sunny situation. With reference to FIG. 3A, the image shows a feature point F3 related to a building and a feature point F4 related to a high-rise tower. In other words, in the case where it is clear and sunny, it is possible to observe both the feature point F3 and the feature point F4 from the observation location where the image illustrated in FIG. 3A is obtained.

On the other hand, FIG. 3B illustrates an example of an image captured in a rainy situation. With reference to FIG. 3B, the image shows only the feature point F3 related to the building. In the example illustrated in FIG. 3B, the top of the high-rise tower is hidden by a cloud, and the feature point F4 is not observed. In other words, in the case of rain, it is possible to observe only the feature point F3 from the observation location where the image illustrated in FIG. 3B is obtained.

Alternatively FIG. 3C illustrates an example of an image captured in the night. With reference to FIG. 3C, the image shows only the feature point F4 related to the high-rise tower. In the example illustrated in FIG. 3C, the image of the top of the building is not captured because of a lack of light intensity. Therefore, the feature point F3 is not observed. In other words, in the night, it is possible to observe only the feature point F4 from the observation location where the image illustrated in FIG. 3C is obtained.

As described above, even in the same unit area, different feature points are observed depending on environmental situations. Therefore, the information processing method according to the present disclosure may generate a recommendation feature point lists corresponding to environmental situations. For example, by using the information processing method according to the present disclosure, it is possible to generate a recommendation feature point list for each environmental situation such as a sunny situation, a rainy situation, or a night situation. Accordingly, it is possible to provide feature point information having high reliability in accordance with environmental situations.

Figure 4:
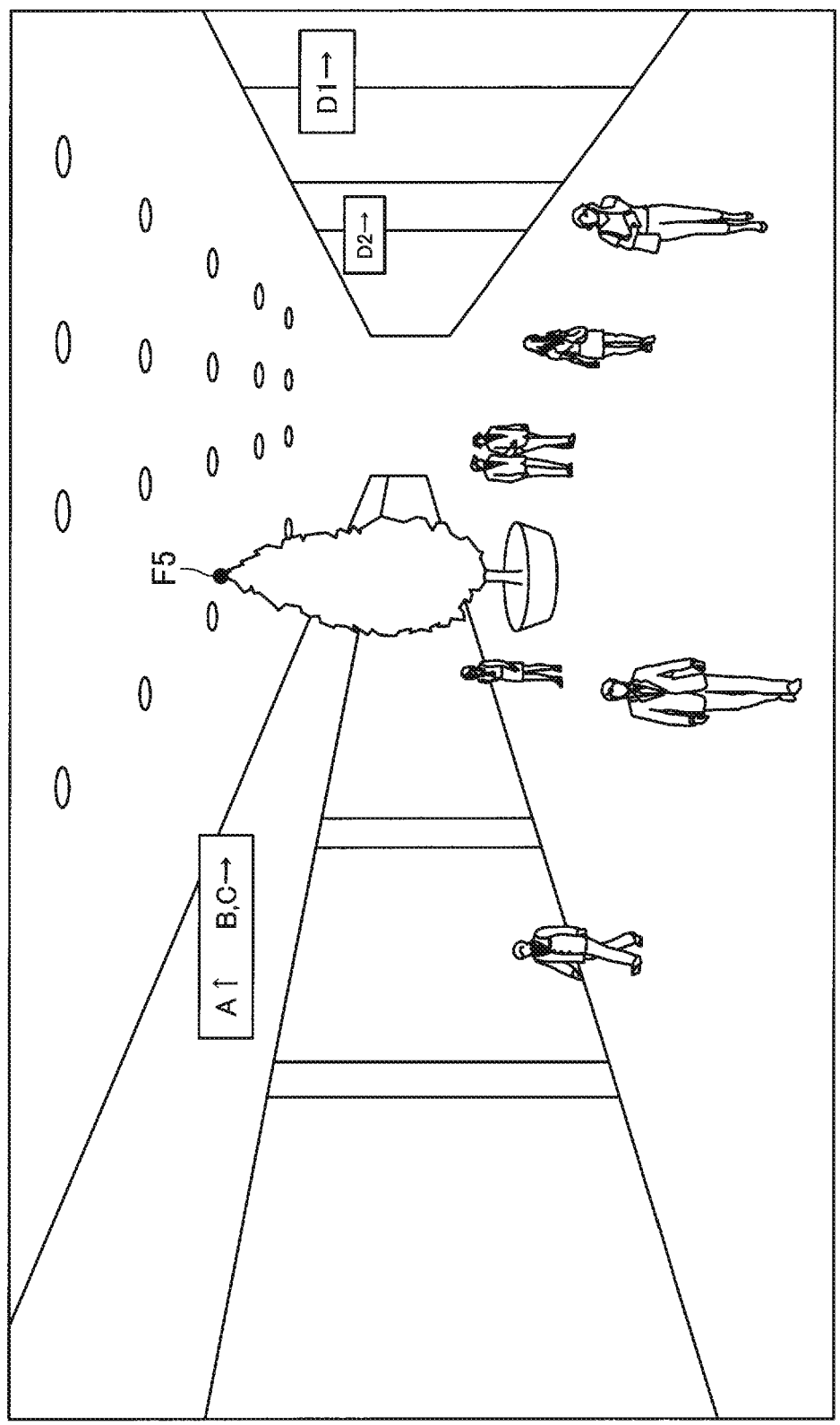
FIG. 4 is a diagram illustrating observation of a feature point in an indoor space according to the present disclosure.

In addition, by using the information processing method according to the present disclosure, it is possible to generate not only an indoor recommendation feature point list but also an outdoor recommendation feature point list. FIG. 4 is a diagram illustrating observation of a feature point in an indoor space. For example, FIG. 4 may be an example of an image captured in an airport.

With reference to FIG. 4, the image shows a feature point F5 related to a potted tree. Most of indoor spaces have similar repeated sights because of the structure of its building. In addition, in the most of the building, different floors have similar structures. Therefore, in the indoor space, a feature point related to a static object which is independent from the structure of the building can be assumed to be a feature point having high reliability. In this case, it is possible for the information processing method according to the present disclosure to identify a characteristic of the object related to the feature point by performing object recognition or the like on the basis of information obtained through observation.

The reliability of feature points according to the present disclosure has been described above. As described above, by using the information processing method according to the present disclosure, it is possible to generate a recommendation feature point list based on reliability of feature points and provide it to various devices. Here, the devices include automated driving AI that controls an autonomous vehicle, or a navigation device, a head-mounted display (HMD) that provides a function related to virtual reality and augmented reality on the basis of self-localization, and the like, for example.

The above-described various devices are capable of performing highly accurate self-localization, by using the recommendation feature point list generated through the information processing method according to the present disclosure. In addition, the recommendation feature point list according to the present disclosure includes local feature amounts of feature points. Therefore, it is possible to reduce a processing load related to extraction of the feature amounts. In addition, it is also possible to achieve an effect of facilitating reverse lookup of a recommendation feature point from a current position.

<2. Embodiment>

<<2.1. System Configuration Example According to Present Embodiment>>

Figure 5:
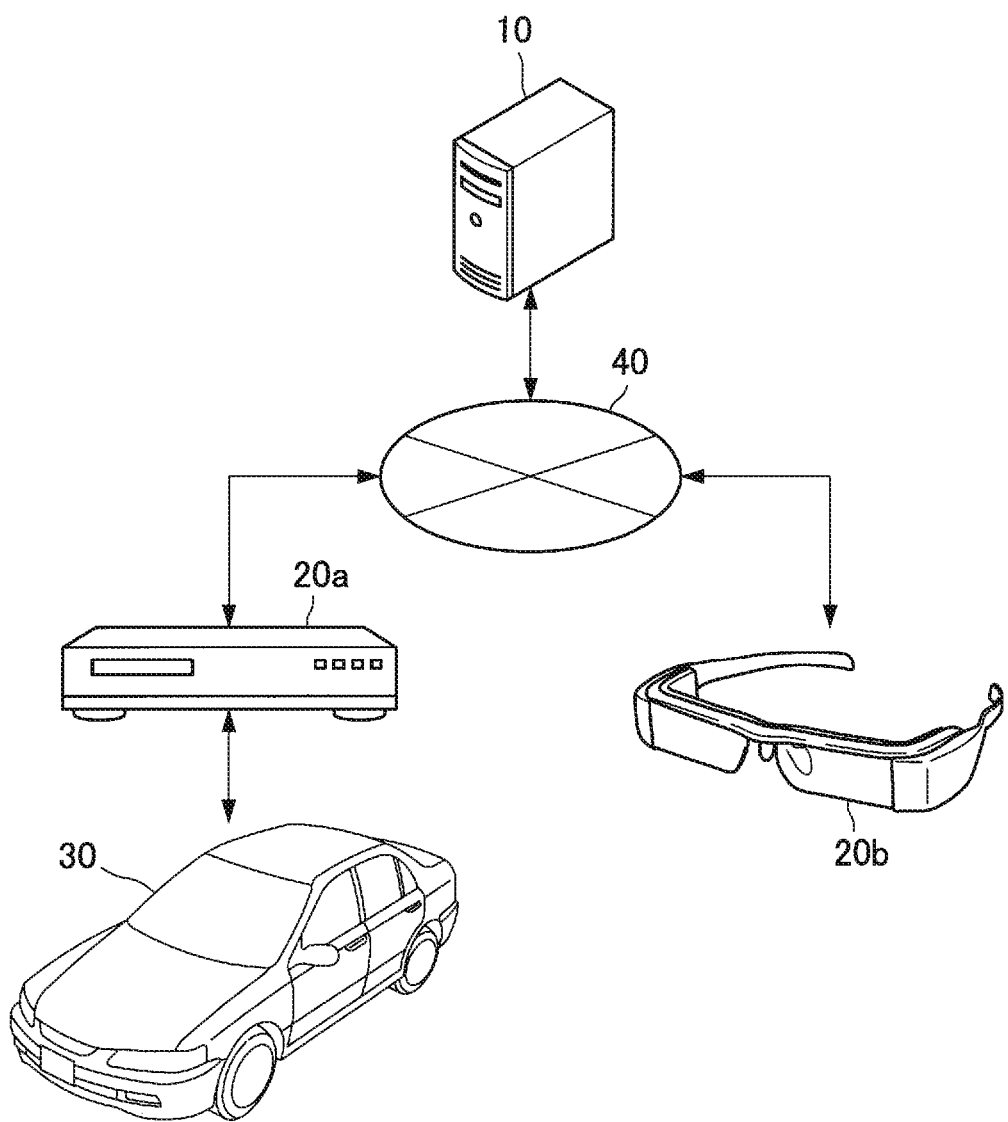
FIG. 5 is a system configuration example according to an embodiment of the present disclosure.

First, a system configuration example according to the present embodiment will be described. With reference to FIG. 5, a system according to the present embodiment includes an information processing server 10, a plurality of information processing devices 20a and 20b, and a mobile object 30. In addition, the information processing server 10, the information processing device 20a, and the information processing device 20b are connected to each other via a network 40 such that they can communicate with each other.

Here, the information processing server 10 according to the present embodiment may be an information processing device configured to generate a feature point list on the basis of observation information collected around a unit area. As described above, the information processing server 10 according to the present embodiment is capable of generating feature point lists corresponding to environmental situations. Note that, the unit area may be an area in an indoor space.

In addition, the information processing device 20 according to the present embodiment may be various devices configured to perform self-localization on the basis of a feature point list acquired from the information processing server 10. In the example illustrated in FIG. 4, the information processing device 20a may be an AI for automated driving that is installed in the mobile object 20 (to be described later). In addition, the information processing device 20b may be a glasses-type wearable device.

On the other hand, the information processing devices 20 according to the present embodiment are not limited to the example illustrated in FIG. 5. For example, the information processing devices 20 according to the present embodiment may be a navigation device, an HMD, various kinds of robots, and the like. The information processing devices 20 according to the present embodiment can be defined as various kinds of devices configured to perform self-localization.

In addition, the mobile object 30 may be a mobile object such as a vehicle provided with the information processing device 20. For example, the mobile object 30 may be an autonomous vehicle controlled by the information processing devices 20 having a function as the AI for automated driving. In this case, the mobile object 30 may be an autonomous vehicle running outdoors, or may be specialized vehicle running indoors like an airport or the like, for example. In addition, the mobile object 30 according to the present embodiment is not limited to the vehicle. For example, the mobile object 30 may be an unmanned aerial vehicle (UAV) including a drone.

In addition, the mobile object 30 according to the present embodiment has a function of delivering observation information observed in a real world to the information processing devices 20. Here, the observation information may include information acquired by an RGB-D camera, a laser rangefinder, GPS, Wi-Fi (registered trademark), a geomagnetic sensor, a barometric sensor, an acceleration sensor, a gyro sensor, a vibration sensor, or the like, for example.

In addition, the network 40 includes a function of connecting the information processing server 10 and the information processing devices 20. The network 40 may include a public network such as the Internet, a telephone circuit network, and a satellite communication network, various local area networks (LANs) including Ethernet (registered trademark), a wide area network (WAN), and the like. In addition, the network 40 may include a dedicated network such as an internet protocol-virtual private network (IP-VPN).

The system configuration example according to the present embodiment has been described above. Next, features of functional configurations of the information processing server 10 and the information processing devices 20 according to the present embodiment will be described.

<<2.2 Information Processing Server 10>>

Next, details of the information processing server 10 according to the present embodiment will be described. The information processing server 10 according to the present embodiment may have a function of receiving observation information collected around a unit area. In addition, the information processing server 10 is capable of generating a feature point list in which three-dimensional coordinates of feature points are associated with local feature amounts of the feature points. The feature points have been detected from the observation information. In addition, the feature point list may be a feature point list associated with the environment information.

Figure 6:
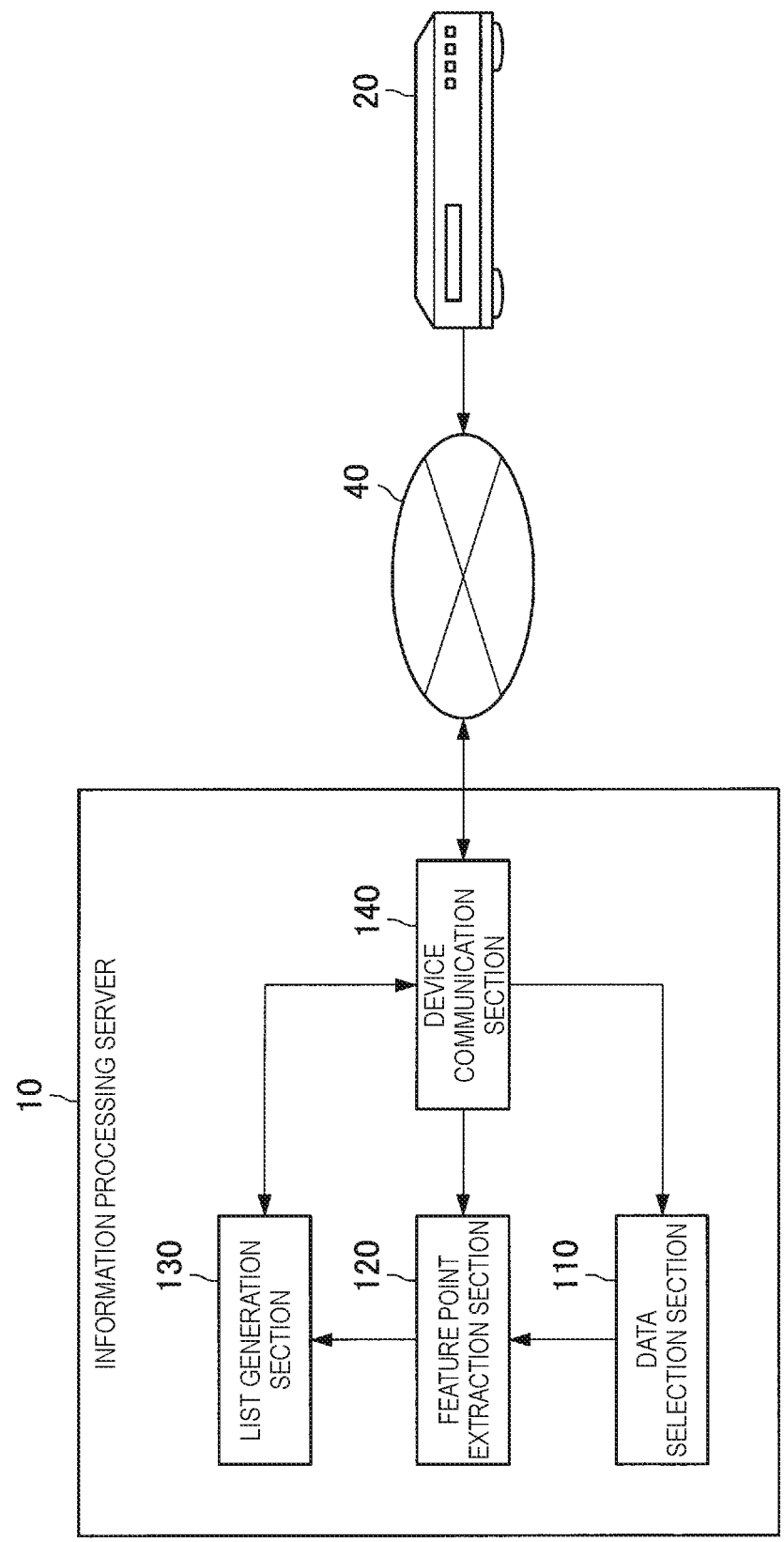
FIG. 6 is a functional block diagram of an information processing server according to the embodiment.

FIG. 6 is a functional block diagram of the information processing server 10 according to the present embodiment. With reference to FIG. 6, the information processing server 10 according to the present embodiment includes a data selection section 110, a feature point extraction section 120, a list generation section 130, and a device communication section 140.

(Data Selection Section 110)

The data selection section 110 has a function of selecting observation information serving as a source that is used for generating a feature point list according to the present embodiment. Specifically, the data selection section 110 may select observation information that is used for generating the feature point list, on the basis of a unit area and environment information.

In addition, the data selection section 110 may select a unit area which is a target of generation of the feature point list, on the basis of map information including a road map, and a traffic history or a walking history in the unit area. Note that, details of data selection performed by the data selection section 110 will be described later.

(Feature Point Extraction 120)

The feature point extraction section 120 has a function of generating a feature point map related to a unit area on the basis of observation information selected by the data selection section 110. Specifically, the feature point extraction section 120 has a function of detecting feature points from a plurality of pieces of observation information, and matching the feature points against each other, to generate the feature point map.

In addition, the feature point extraction section 120 may calculate a camera parameter on the basis of a result of matching feature points against each other. In addition, the feature point extraction section 120 is capable of performing a minimization process of a projection error on the basis of the calculated camera parameter. Details of the feature point map generation performed by the feature point extraction section 120 will be described later.

(List Generation Section 130)

The list generation section 130 has a function of generating a feature point list on the basis of the feature point map generated by the feature point extraction section 120. More specifically, the list generation section 130 is capable of generating a recommendation feature point list in which feature points are ranked per unit area.

In this case, the list generation section 130 may rank the feature points on the basis of projection errors of the feature points or positional errors related to observation points of the observation information. In other words, the list generation section 130 is capable of extracting a feature point with a smaller error, as a feature point having high reliability.

In addition, the list generation section 130 may rank the feature points on the basis of the number of pieces of observation information related to the feature points. In other words, the list generation section 130 is capable of extracting a feature point extracted from a larger number of pieces of observation information, as a feature point having high reliability.

In addition, the list generation section 130 may rank the feature points on the basis of the number of pieces of observation information related the feature points observed in another unit area near a unit area used for generating the feature point list. In other words, the list generation section 130 is capable of extracting a feature point which may also be observed from a neighborhood unit area, as a feature point having high reliability. Note that, details of recommendation feature point list generation performed by the list generation section 130 will be described later.

(Device Communication Section 140)

The device communication section 140 has a function of establishing communication with the information processing devices 20. Specifically, the device communication section 140 according to the present embodiment has a function of receiving observation information collected around a unit area, from the information processing devices 20. In addition, the device communication section 140 has a function of transmitting the recommendation feature point list to the information processing device 20 in response to a request from the information processing device 20.

The functional configuration of the information processing server 10 according to the present embodiment has been described above. As described above, the information processing server 10 according to the present embodiment is capable of generating a feature point list corresponding to a unit area and environment information on the basis of acquired observation information. In addition, the recommendation feature point list includes local feature amounts related to feature points. By using the above-described functions of the information processing server 10 according to the present embodiment, it is possible to provide feature point information having high reliability, and it is possible to effectively increase accuracy of self-localization performed by the information processing devices 20.

<<2.3. Information Processing Device 20>>

Next, details of the information processing device 20 according to the present embodiment will be described. The information processing devices 20 according to the present embodiment may be various devices configured to perform self-localization. Therefore, the information processing device 20 according to the present embodiment has a function of extracting a feature point and a local feature amount related to the feature point from acquired image information. In addition, the information processing device 20 has a function of acquiring a feature point list on the basis of collected observation information.

In addition, the information processing device 20 according to the present embodiment has a function of performing self-localization on the basis of the extracted local feature amounts and the feature point list. Here, the feature point list may be a recommendation feature point list generated by the information processing server 10. In other words, the feature point list may be a list including local feature amounts related to feature points and three-dimensional coordinate positions of the feature points associated with a unit area including an observation point of the observation information.

Figure 7:
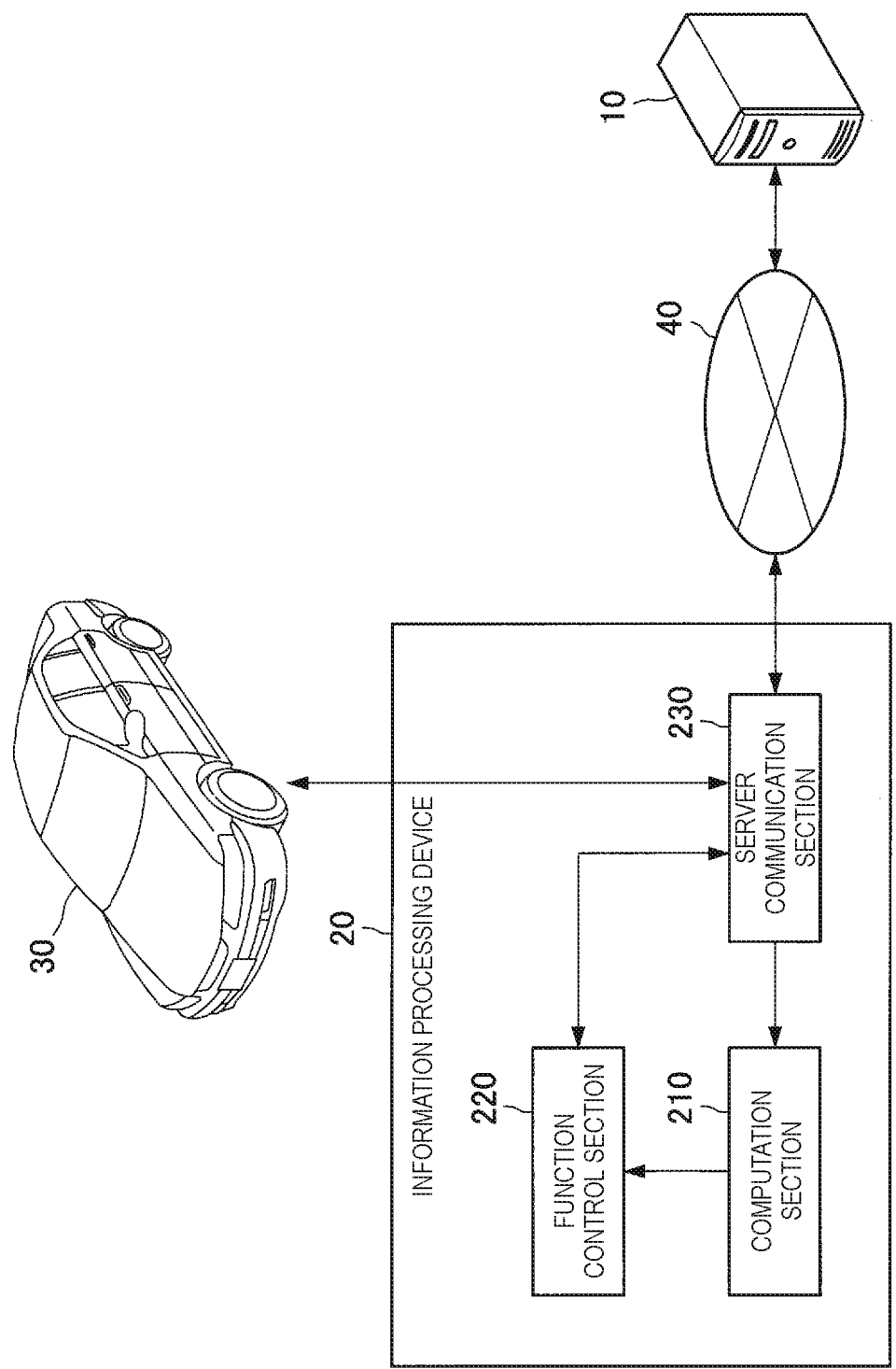
FIG. 7 is a functional block diagram of an information processing device according to the embodiment.

FIG. 7 is a functional block diagram of the information processing device 20 according to the present embodiment. With reference to FIG. 7, the information processing device 20 according to the present embodiment includes a computation section 210, a function control section 220, and a server communication section 230.

(Computation Section 210)

The computation section 210 has a function of extracting a feature point and a local feature amount related to the feature point from acquired image information. In addition, the computation section 210 has a function of calculating a camera parameter of an imaging section (not illustrated) that has acquired the image information. Here, the camera parameter may include a three-dimensional coordinate position, attitude information, speed, angular velocity, a triaxial rotation attitude, triaxial rotation speed, and triaxial rotation acceleration.

The computation section 210 according to the present embodiment is capable of drastically improving efficiency related to the process of the camera parameter calculation, by referring to the recommendation feature point list acquired from the information processing server 10.

(Function Control Section 220)

The function control section 220 has a function of controlling operation of the information processing devices 20 on the basis of a camera parameter calculated by the computation section 210. In other words, the function control section 220 may control various kinds of operation corresponding to characteristics of the information processing devices 20 on the basis of the camera parameter.

For example, in the case where the information processing device 20 is an AI for automated driving, the function control section 220 may have a function as an operation control section configured to control operation of the mobile object 30. In other words, in this case, the function control section 220 is capable of controlling driving of the mobile object 30 on the basis of a result of self-localization.

In addition, for example, in the case where the information processing device 20 is an HMD or the like having a function related to virtual reality and augmented reality, the function control section 220 may have a function as a display control section configured to control display related to at least any of virtual reality and augmented reality on the basis of the camera parameter. In other words, in this case, the function control section 220 is capable of controlling display of a virtual object or the like on the basis of a result of self-localization.

In addition, for example, in the case where the information processing device 20 is a device having a navigation function, the function control section 220 may have a function as a navigation section configured to perform route navigation related to the mobile object 30 on the basis of the camera parameter. In other words, in this case, the function control section 220 is capable of performing highly accurate navigation on the basis of a result of self-localization.

(Server Communication Section 230)

The server communication section 230 has a function of acquiring a recommendation feature point list from the information processing server 10 on the basis of collected observation information. Here, in the case where the information processing device 20 is the AI for automated driving or the navigation device, the observation information may be observation information acquired from a sensor installed in the mobile object 30. Alternatively, the information processing device 20 is the HMD or the wearable device, the observation information may be observation information acquired from various sensors installed in the information processing device 20.

In addition, the server communication section 230 may be capable of acquiring the recommendation feature point list further on the basis of collected environment information. In this case, the acquired recommendation feature point list may be a feature point list associated with environment information.

In addition, the environment information may be information acquired from various sensors installed in the information processing device 20 or the mobile object 30, or may be information acquired by the server communication section 230 via a network. The server communication section 230 is capable of requesting the recommendation feature point list from the information processing server 10 on the basis of weather information acquired on the Internet, for example.

The details of the information processing devices 20 according to the present embodiment have been described above. As described above, the information processing device 20 according to the present embodiment is capable of receiving the recommendation feature point list from the information processing server 10 on the basis of the acquired observation information and environment information. In addition, the information processing device 20 is capable of performing highly accurate self-localization by using the recommendation feature point list. By using the information processing device 20 according to the present embodiment, it is possible to drastically improve control based on self-localization.

<<2.4. Overview of Recommendation Feature Point List Generation>>

Next, an overview of generation of a recommendation feature point list according to the present embodiment will be described. As described above, the information processing server 10 according to the present embodiment is capable of generating a recommendation feature point list related to a unit area on the basis of collected observation information. In this case, the information processing server 10 according to the present embodiment may generate a recommendation feature point list associated with environment information.

Here, the environment information may include information related to weather, a lighting environment, an atmospheric state, time, a date, or the like. The weather may include states of rain, snow, fog, clouds, and the like, for example. For example, the information processing server 10 according to the present embodiment is capable of generating a plurality of lists with regard to a single unit area, such as a recommendation feature point list associated with a rainy environment and a recommendation feature point list associated with a night-time environment.

When acquiring the recommendation feature point list corresponding to a current environment state, the information processing device 20 becomes capable of referring to a list of feature points observable in a rainy state or feature points observable in the night. Therefore, it is possible to improve accuracy of self-localization.

Figure 8:
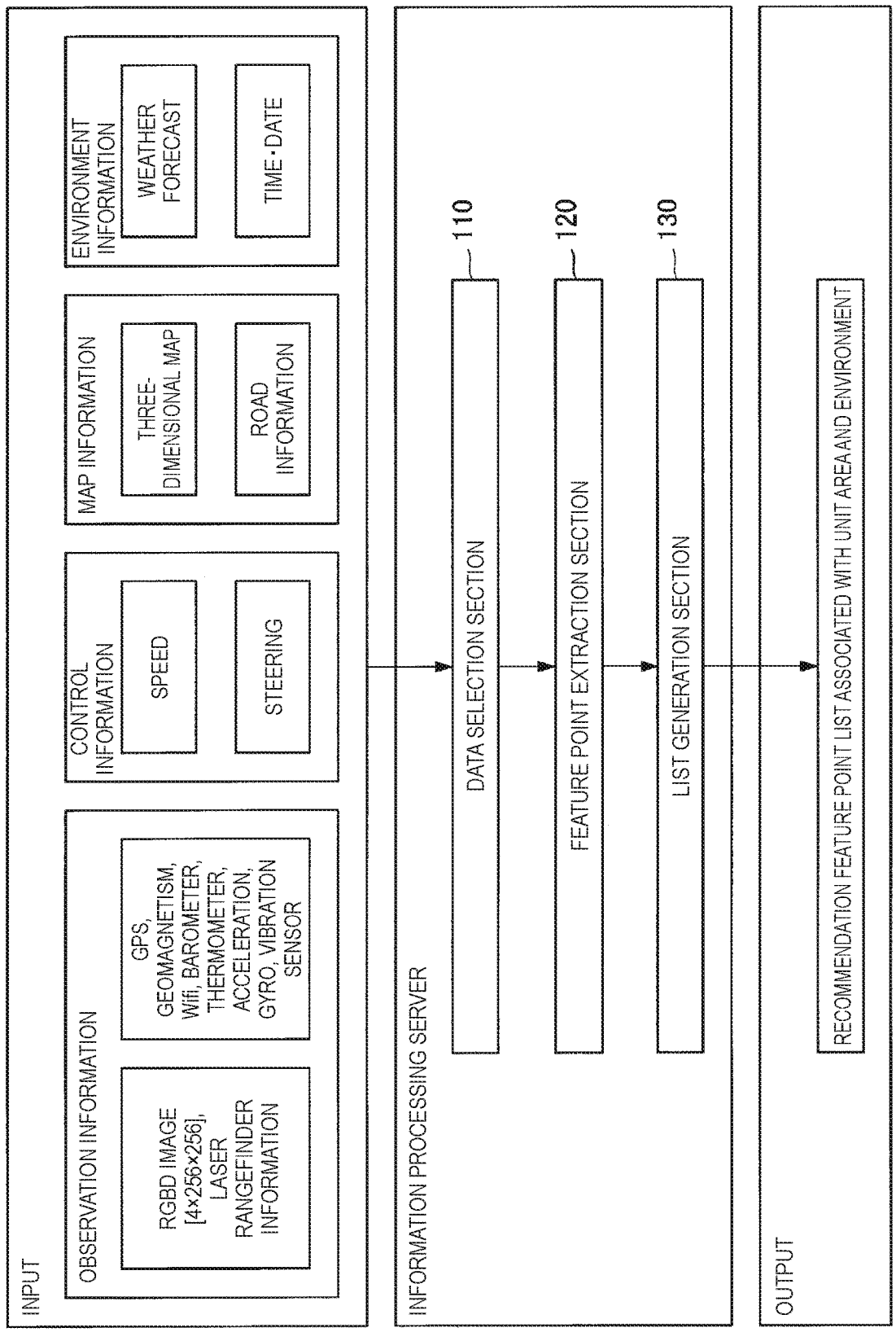
FIG. 8 is a conceptual diagram illustrating input/output related to generation of a recommendation feature point list according to the embodiment.

FIG. 8 is a conceptual diagram illustrating input/output data related to generation of a recommendation feature point list by the information processing server 10 according to the present embodiment. With reference to FIG. 8, the information processing server 10 according to the present embodiment is capable of outputting a recommendation feature point list associated with a unit area and environment information on the basis of various kinds of input information.

Here, information input to the information processing server 10 may include observation information, control information, map information, environment information, and the like.

The observation information may include RGDB images or laser rangefinder information, for example. Here, the observation information may include information acquired by GPS, Wi-Fi, a geomagnetic sensor, a barometric sensor, a temperature sensor, an acceleration sensor, a gyro sensor, a vibration sensor, or the like. The observation information may be acquired from sensors installed in the mobile object 30 or the information processing device 20.

In addition, for example, the control information may include information related to control of the mobile object 30. Specifically, the control information may include speed information or steering information. The information processing server 10 is capable of using the control information for estimating positions related to observation points of observation information.

In addition, for example, the map information may include information such as a three-dimensional map or a road map. Here, the three-dimensional map may be a three-dimensional feature point map, or may be a polygonized three-dimensional model map. The three-dimensional map according to the present embodiment is not limited to the map constituted by feature point groups related to static objects. The three-dimensional map according to the present embodiment may be various kinds of maps to which color information of respective feature points, attribute information, physical property information, or the like based on an object recognition result is added.

In addition, as described above, the environment information may include time information and weather information including weather forecast. In addition, in the case of generating a recommendation feature point list related to an indoor space, the environment information may include information regarding a lighting environment or the like.

The various kinds of information input to the information processing server 10 have been described above. The information processing server 10 according to the present embodiment is capable of outputting a recommendation feature point list associated with a unit area and environment information on the basis of the various kinds of information.

In this case, as illustrated in FIG. 8, the information processing server 10 may output the recommendation feature point list by sequentially conducting selection of usage data by the data selection section 110, generation of a feature point map by the feature point extraction section 120, and extraction of a recommendation feature point by the list generation section 130.

FIG. 9 is a data configuration example of a recommendation feature point list output from the information processing server 10 through the above-described process. With reference to FIG. 9, a recommendation feature point list according to the present embodiment may include information regarding unit area coordinates, IDs, feature point coordinates, feature amount vectors, and the like. With reference to FIG. 9, unit area coordinates and feature point coordinates are represented by three-dimensional coordinates using an X axis, Y axis, and Z axis. In this case, a size of a space related to a unit area may be designed such that the space includes a predetermined distance from one coordinate point as illustrated in FIG. 9. Alternatively, the size of the space related to the unit area may be defined by a plurality of coordinate points. In this case, the unit area coordinated in the recommendation feature point list may be defined by a plurality of coordinate points.

In addition, as illustrated in FIG. 9, the recommendation feature point list according to the present embodiment includes local feature amount vectors related to feature points. Here, the local feature amount vector may have a data type corresponding to a local descriptor or the like used for extracting a local feature amount. For example, in the case where the scale-invariant feature transform (SIFT) is used for extracting a local feature amount, the local feature amount vector may be represented by a 128-dimensional feature amount vector. In addition, in the case of extracting a local feature amount by using a neural network (to be described later), the local feature amount vector may be represented by a vector corresponding to an output usage of the neural network.

The data configuration example of the recommendation feature point list according to the present embodiment has been described above. By generating the above-described recommendation feature point list, the information processing server 10 according to the present embodiment is capable of improving accuracy of self-localization performed by the information processing device 20.

<<2.5. Details of Usage Data Selection>>

Figure 10:
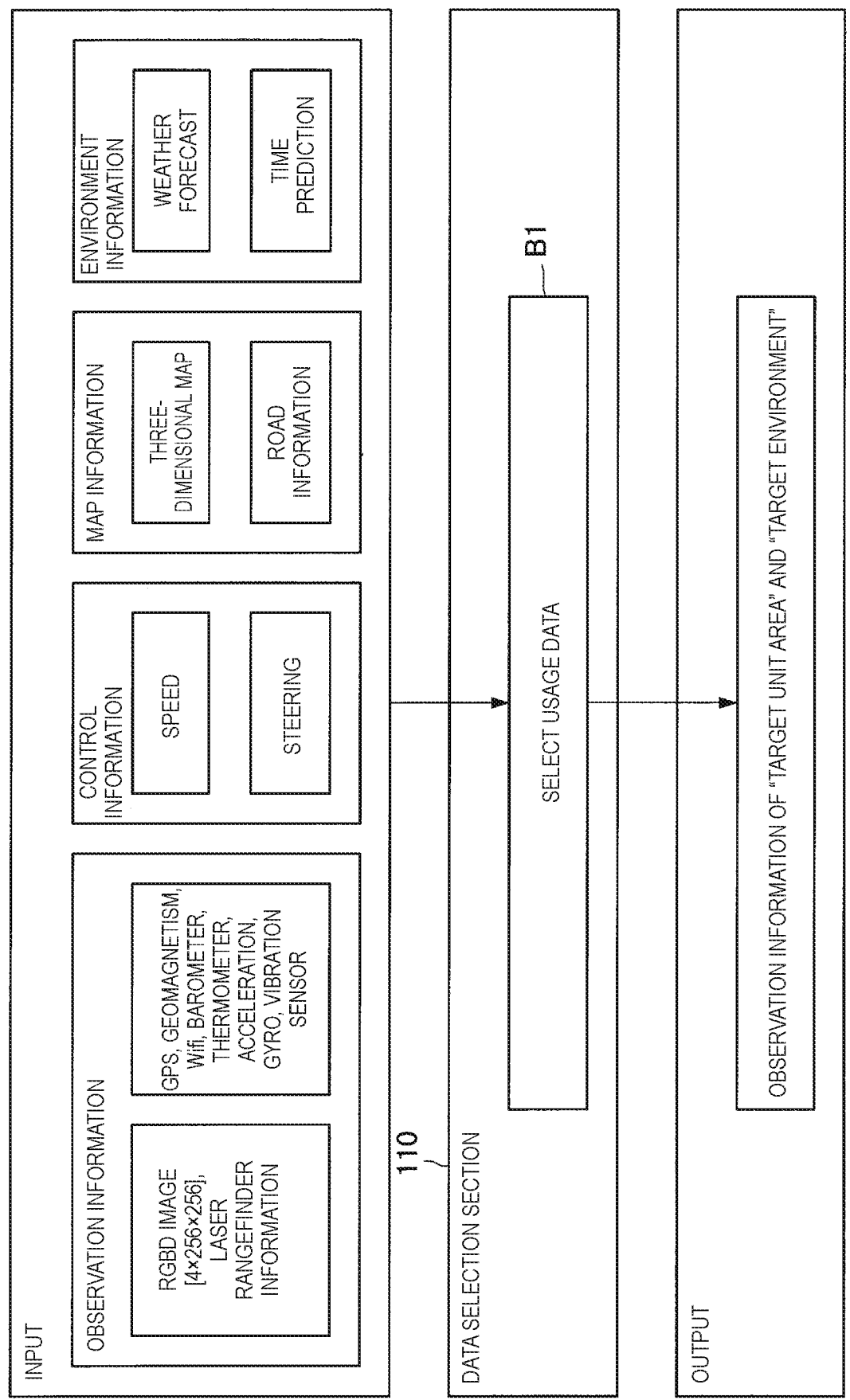
FIG. 10 is a conceptual diagram illustrating input/output related to a data selection section according to the embodiment.

Next, details of selection of usage data by the data selection section 110 according to the present embodiment will be described. As described above, the data selection section 110 according to the present embodiment is capable of selecting data to be used, on the basis of an environmental situation and a unit area that is a target of the recommendation feature point list generation. FIG. 10 is a conceptual diagram illustrating input/output related to the data selection section 110 according to the embodiment.

With reference to FIG. 10, the data selection section 110 according to the present embodiment is capable of selecting usage data to be used for generating a recommendation feature point list, on the basis of input information. In other words, the data selection section 110 according to the present embodiment has a function of sorting out a piece of observation information complying with a target unit area and its environmental situation, on the basis of input information. Note that, various kinds of information input to the data selection section 110 are similar to the input information that has already been described with reference to FIG. 8. Therefore, repeated description is omitted here. In addition, in FIG. 10, a usage data selection function included in the data selection section 110 is provided with the reference sign B1.

Figure 11:
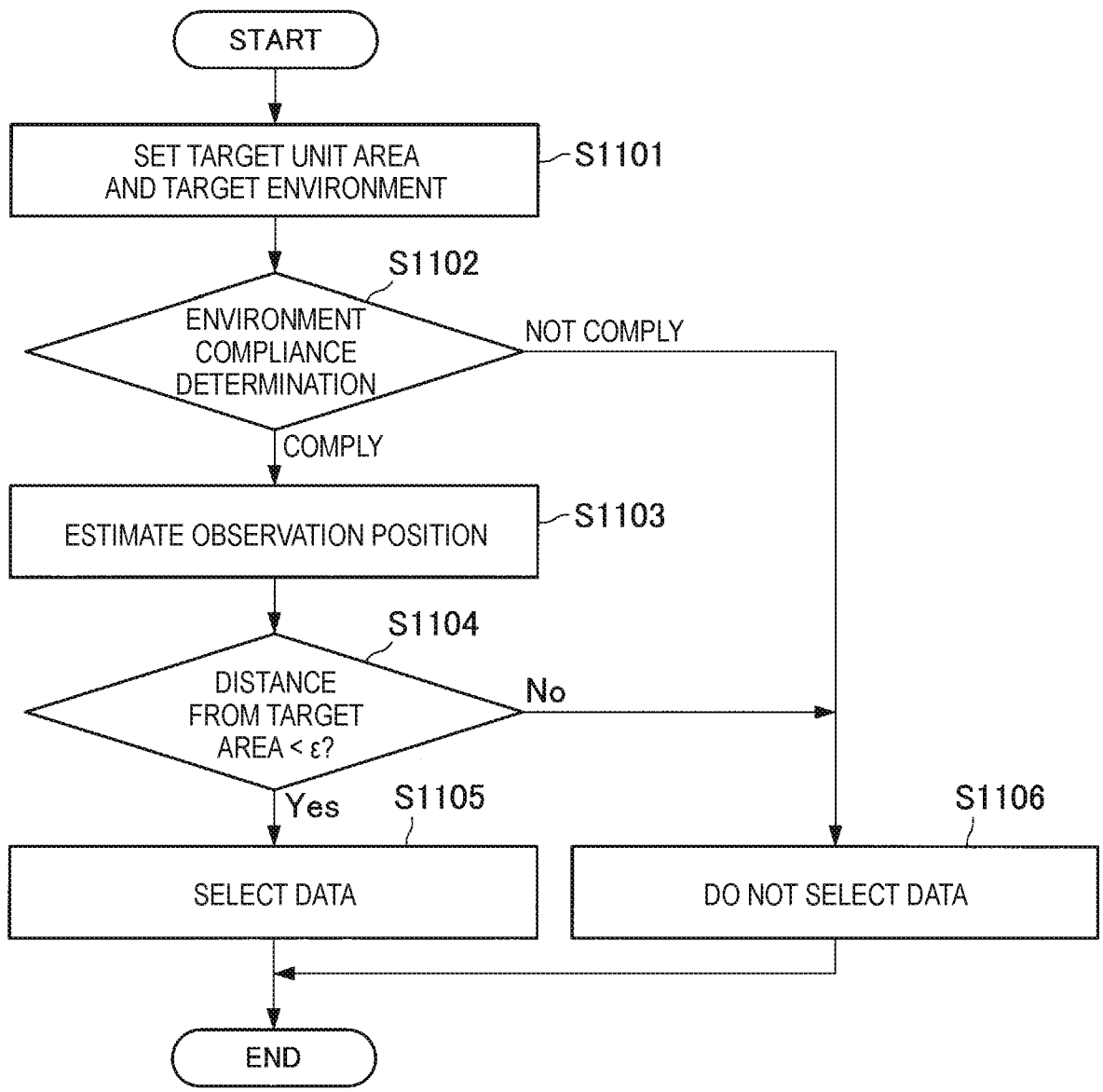
FIG. 11 is a flowchart illustrating a workflow related to usage data determination according to the embodiment.

Next, with reference to FIG. 11, details of a workflow of usage data determination according to the present embodiment will be described. FIG. 11 is a flowchart illustrating the workflow related to usage data determination according to the present embodiment.

With reference to FIG. 11, the data selection section 110 first sets a target unit area and a target environment (S1101). In this case, the data selection section 110 may set the target unit area on the basis of map information including road information, traffic information, or a walking history. In other words, the information processing server 10 according to the present embodiment is capable of generating a more valuable recommendation feature point list by focusing on setting a heavily trafficked area or an area with heavy pedestrian traffic as the target unit area. Note that, in this case, the information may be information included in a road map or three-dimensional map to be input.

In addition, the data selection section 110 according to the present embodiment may set the target unit area and the target environment on the basis of user input. In this case, the user is capable of setting the target by arbitrarily inputting information regarding a coordinate position, weather, time, or the like related to the unit area.

Next, the data selection section 110 may determine whether the acquired observation information complies with the environment (S112). In this case, for example, the data selection section 110 may determine whether the acquired observation information complies with the environment, on the basis of observation time or the like linked with the observation information. In addition, the data selection section 110 may determine whether the acquired observation information complies with the environment, on the basis of meteorological information including input weather information.

In addition, in the case where the meteorological information is not input, the data selection section 110 may recognize weather or the like from various kinds of sensor information included in the observation information, and then determine whether the acquired observation information complies with the environment. For example, the data selection section 110 may determine weather from acquired image information.

Here, in the case where the observation information does not comply with the target environment ("DOES NOT COMPLY" in S1102), the data selection section 110 does not select the observation information (S1106), and proceeds to usage determination of next observation information.

On the other hand, in the case where the observation information complies with the target environment ("COMPLY" in S1102), the data selection section 110 subsequently estimates an observation position (S1103). In other words, the data selection section 110 may estimate a position where the observation information has been acquired.

At this time, in the case where GPS information related to the observation time is included in the input information, the data selection section 110 is capable of roughly estimating an observation position and direction by using the GPS information. On the other hand, in the case where GPS information related to the observation time is not input, the data selection section 110 is capable of roughly estimating an observation position and direction on the basis of last GPS information, map information, or control information. Here, as described above, the control information may be speed information or steering information acquired from the mobile object 30, for example.

For example, the data selection section 110 is capable of detecting that the mobile object 30 has traveled 30 meters in a tunnel, and estimating the observation position on the basis of last GPS information. Alternatively, the data selection section 110 is also capable of roughly estimating the observation position on the basis of Wi-Fi information. By using the above-described functions of the data selection section 110, it is possible to roughly estimate an observation position related to observation information acquired in a tunnel, indoor space, underground, multipath environment, or the like.

When the estimation of the observation position finishes, the data selection section 110 subsequently calculates a distance between the estimated observation position and the target unit area, and determines whether the estimated observation position complies with the target unit area (S1104). At this time, in the case where the distance between the observation position and the target unit area is a predetermined threshold ε or more (NO in S1104), the data selection section 110 may determine that the observation information is not observation information related to the target unit area, and decide not to select the data (S1106).

On the other hand, in the case where the distance between the observation position and the target unit area is less than the predetermined threshold ε (YES in S1104), the data selection section 110 may determine that the observation information is observation information related to the target unit area, and select the observation information (S1105).

The details of selection of usage data by the data selection section 110 according to the present embodiment have been described above. As described above, the data selection section 110 according to the present embodiment is capable of selecting observation information to be used for generating a recommendation feature point list, on the basis of acquired input information including observation information.

<<2.6. Details of Three-Dimensional Map Generation>>

Figure 12:
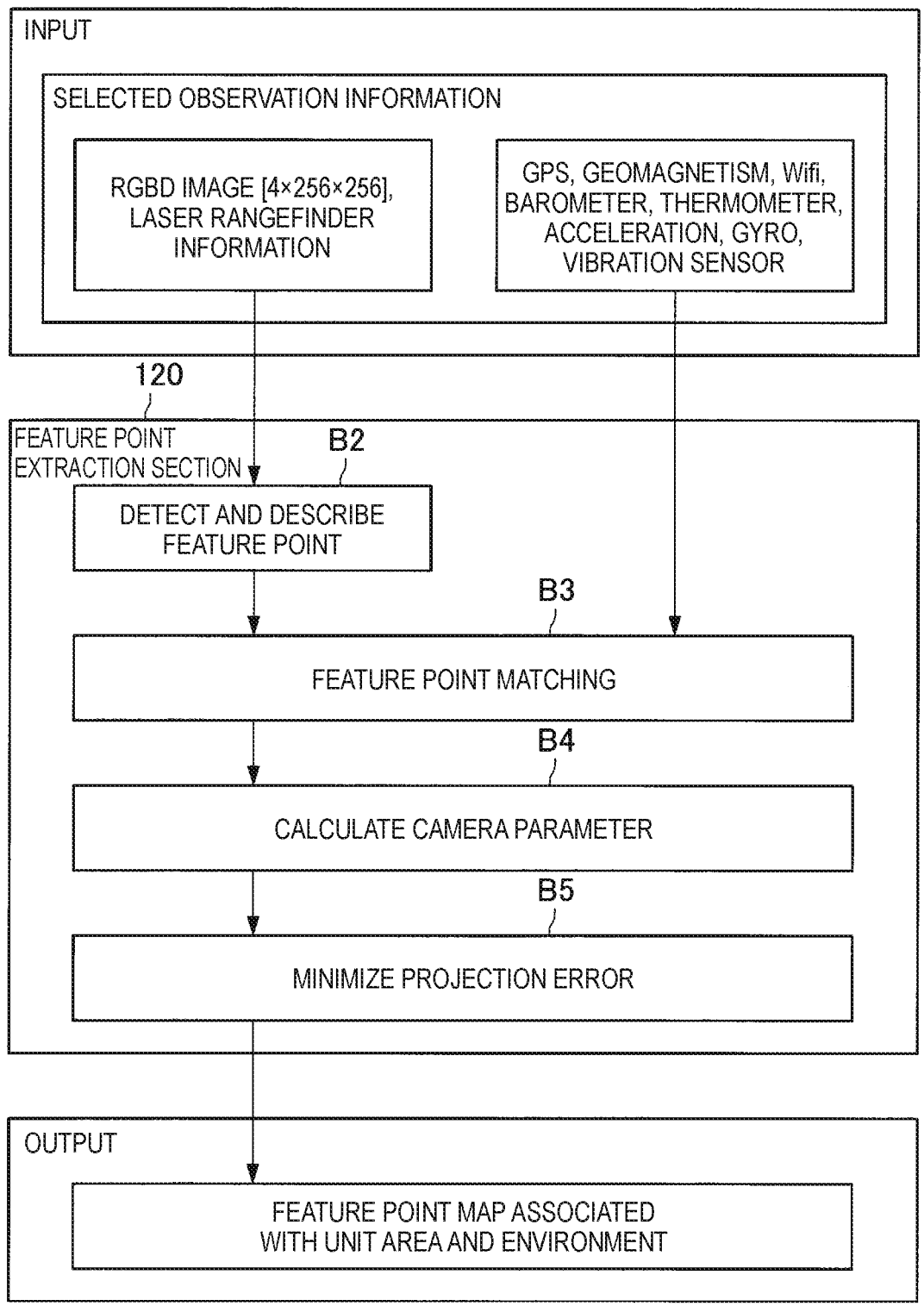
FIG. 12 is a conceptual diagram illustrating input/output related to a feature point extraction section according to the embodiment.

Next, details of three-dimensional map generation according to the present embodiment will be described. The feature point extraction section 120 according to the present embodiment is capable of generating a feature point map on the basis of observation information selected by the data selection section 110. FIG. 12 is a conceptual diagram illustrating input/output related to the feature point extraction section 120. Note that, in FIG. 12, functions of the feature point extraction section 120 are provided with respective reference signs B2 to B5.

(Feature Point Detection)

With reference to FIG. 12, the feature point extraction section 120 has a function of detecting a feature point from a plurality of pieces of observation information selected by the data selection section 110, and describing the extracted feature point (Function B2). In this case, for example, the feature point extraction section 120 may detect the feature point by using a local descriptor such as the scale-invariant feature transform (SIFT) or speeded up robust features (SURF). In addition, for example, it is also possible for the feature point extraction section 120 to use Harris Corner Detector.

(Feature Point Matching)

In addition, the feature point extraction section 120 also has a function of matching respective feature points against each other, on the basis of description of the feature points related to the plurality of pieces of observation information output from the function B2 (Function B3). At this time, the feature point extraction section 120 matches the feature points having a correspondence relation between the plurality of pieces of observation information, against each other.

At this time, the feature point extraction section 120 may perform matching corresponding to the method that has been used for detecting the feature points. For example, in the case where the SIFT or the SURF is used for detecting the feature points, the feature point extraction section 120 may perform the matching using a method that is widely known in each of the local descriptor.

In addition, in the feature point mapping, the feature point extraction section 120 may use sensor information that is included in the observation information. The sensor information has been acquired from GPS, a geomagnetic sensor, Wi-Fi, a barometric sensor, an acceleration sensor, a gyro sensor, and a vibration sensor. The feature point extraction section 120 is capable of increasing efficiency of the feature point mapping by using positional information that is roughly calculated from the sensor information.

(Camera Parameter Calculation)

In addition, the feature point extraction section 120 also has a function of calculating three-dimensional coordinates of a feature point on the basis of matching information output from the function B3, and calculating a camera parameter corresponding to each piece of the observation information from the three-dimensional coordinates of the feature point (Function B4). Here, the camera parameter may include various internal parameters such as a vector of a degree of freedom of the camera. For example, the camera parameter according to the present embodiment may be positional coordinates (X, Y, Z) of the camera and rotation angles ($\Phi x$, $\Phi y$, $\Phi z$) of the respective coordinate axes. In addition, for example, the camera parameter according to the present embodiment may include an internal parameter such as a focal length, f-number, or a shear factor.

In this case, the feature point extraction section 120 may continuously calculate relative values such as positions of a feature point in consecutive frames (RGBD image), a position vector between cameras, a triaxial rotation vector of a camera, and a vector connecting a feature point and a position between respective cameras. The feature point extraction section 120 is capable of calculating the above by solving an epipolar equation based on epipolar geometry.

In addition, in calculation of the camera parameter, the feature point extraction section 120 is capable of improving efficiency of the calculation of the camera parameter by using positional information roughly calculated from the sensor information.

(Projection Error Minimization)

In addition, the feature point extraction section 120 has a function of minimizing a projection error on the basis of the camera parameter output from the function B4 (Function B5). Specifically, the feature point extraction section 120 performs a statistical process of minimizing position distribution of respective feature points and respective camera parameters.

At this time, the feature point extraction section 120 is capable of minimizing the projection error by detecting a feature point having a large error and deleting the feature point. For example, the feature amount extraction section 120 may estimate an optimum solution of the least squares method by using the Levenberg-Marquardt method. Accordingly, the feature point extraction section 120 is capable of finding a camera position with a converged error, a camera rotation matrix, and three-dimensional coordinates of a feature point.

The details of three-dimensional map generation according to the present disclosure have been described above. As described above, the feature point extraction section 120 according to the present embodiment is capable of generating a feature point map on the basis of observation information selected by the data selection section 110. In other words, the feature point extraction section 120 according to the present embodiment is capable of generating a feature point map related to a target unit area and a target environment. Note that, here, the feature point map may include three-dimensional coordinates of a feature point, an error thereof, a camera position, and an error thereof.

<<2.7. Details of Recommendation Feature Point List Generation>>

Figure 13:
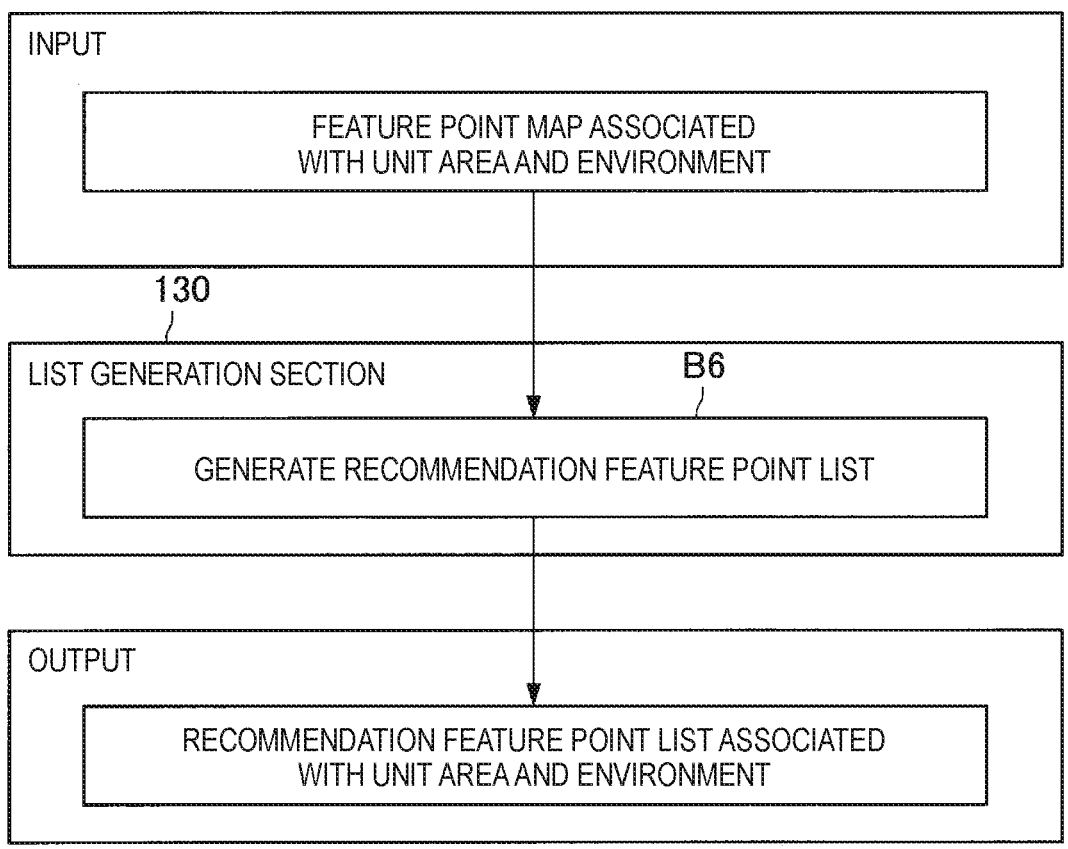
FIG. 13 is a conceptual diagram illustrating input/output related to a list generation section according to the embodiment.

Next, details of recommendation feature point list generation according to the present embodiment will be described. FIG. 13 is a conceptual diagram illustrating input/output related to the list generation section 130 according to the present embodiment. With reference to FIG. 13, the list generation section 130 according to the present embodiment outputs a recommendation feature point list associated with a unit area and environment information on the basis of an input feature point map. Here, the above-described feature point map may be a feature point map generated by the feature point extraction section 120. Note that, in FIG. 13, a recommendation feature point list generation function of the feature point extraction section 130 is provided with a reference sign B6.

Figure 14:
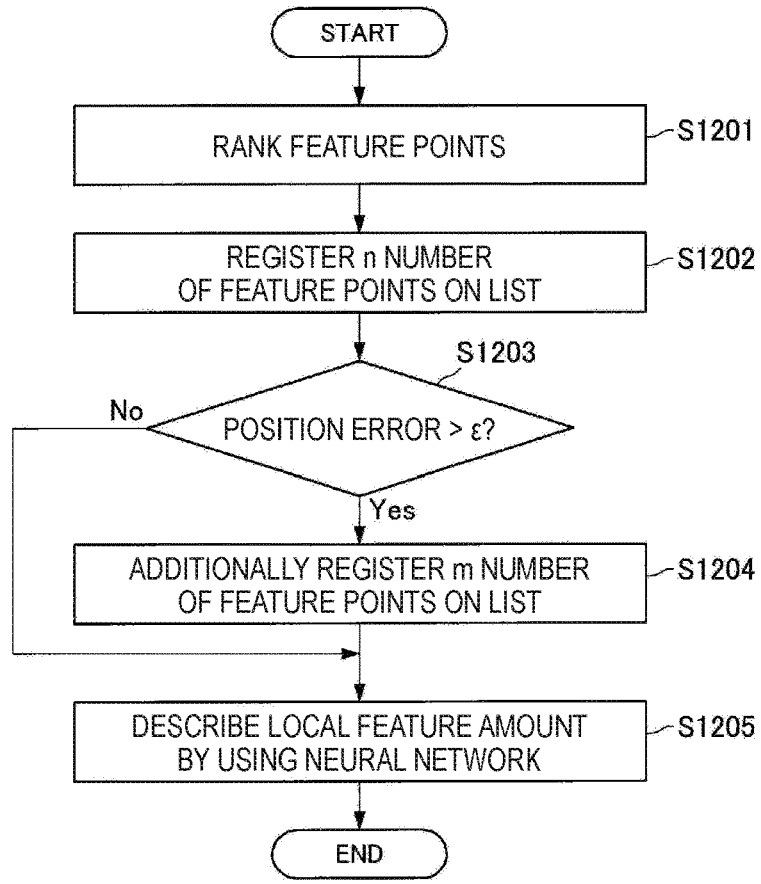
FIG. 14 is a flowchart illustrating a workflow related to recommendation feature point list generation according to the embodiment.

Next, with reference to FIG. 14, details of a workflow of recommendation feature point list generation according to the present embodiment will be described. FIG. 14 is a flowchart illustrating a workflow related to the recommendation feature point list generation according to the present embodiment.

With reference to FIG. 14, the list generation section 130 first ranks feature points described in the feature point map (S1201). At this time, the list generation section 130 may ranks the feature points on the basis of a camera position error and projection errors of the feature points included in the feature point map. In other words, the list generation section 130 according to the present embodiment is capable of determining a feature point having a smaller projection error and a smaller camera position error, as a feature point having high reliability.

In addition, the list generation section 130 may rank the feature points in accordance with a property of a unit area. For example, the list generation section 130 is also capable of selecting a feature point having higher reliability, on the basis of a result of object recognition based on the feature point map. For example, in a unit area related to an indoor space, the list generation section 130 is also capable of determining a feature point related to a static object that is independent from a building, as a feature point having high reliability.

In addition, the list generation section 130 is also capable of ranking the feature points on the basis of the number of pieces of observation information in which feature points are observed. In other words, the list generation section 130 according to the present embodiment is capable of determining a feature point that may be observed from many observation points in a unit area, as a feature point having high reliability.

Figure 15:
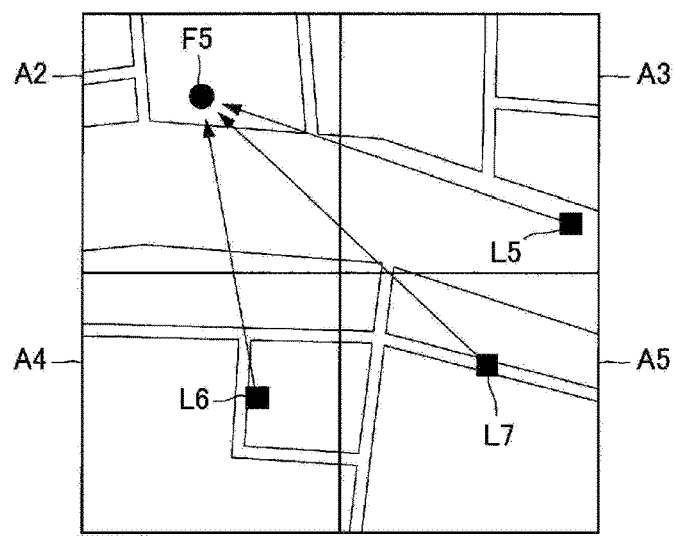
FIG. 15 is a diagram illustrating a feature point that may be observed from neighborhood unit areas according to the embodiment.

In addition, the list generation section 130 is also capable of ranking the feature points on the basis of the number of pieces of observation information observed in another unit area near a target unit area. FIG. 15 is a diagram illustrating a feature point that may be observed from neighborhood unit areas.

FIG. 15 illustrates a plurality of unit areas A2 to A5. The unit area A2 includes a feature point F6. In addition, the unit areas A3 to A5 respectively include observation points L5 to L7. Here, the unit area 2 may be a unit area that is a target of recommendation feature point list generation.

With reference to FIG. 15, it is understood that the feature point F6 in the unit area A2 that is the target unit area is observed from the observation points L5 to L7 in the unit area A3 to A5 that are the neighborhood unit areas.

As illustrated in FIG. 15, the list generation section 130 according to the present embodiment may rank feature points on the basis of pieces of observation information from unit areas that are positioned near a target unit area. In other words, the list generation section 130 is capable of determining a feature point that may be observed in many regions, as a feature point having high reliability. For example, it is possible for the recommendation feature point list to include a feature point that may be observed by the mobile object 30 moving into a target unit area, since the list generation section 130 ranks feature points on the basis of pieces of observation information acquired in neighborhood unit areas. Accordingly, it is possible for the information processing device 20 mounted on the mobile object 30 to perform control based on information of a feature point that is present in a moving direction of the mobile object 30.

Returning to the description with reference to FIG. 14, the list generation section 130 registers N number of feature points on the recommendation feature point list on the basis of the above-described ranking, after the ranking of the feature points (S1202). Here, the number of registered feature points may be a predetermined number that is decided in advance. Note that, the predetermined number may be dynamically set in accordance with a size of a property of a target unit area. Alternatively, the predetermined number may be dynamically set in accordance with a property of a target environment.

Next, the list generation section 130 makes a determination related to a position error (S1203). At this time, the list generation section 130 may compare the positional information estimated in Step S1103 illustrated in FIG. 11 with positional information calculated when extracting the feature point.

Here, in the case where the position error is larger than a predetermined threshold ε (Yes in S1203), the list generation section 130 may additionally register m number of feature points on the recommendation feature point list (S1204). Position estimation is assumed to be difficult in a unit area having a large position error. For example, it is difficult to acquire GPS information in the unit area having a large position error. Therefore, the list generation section 130 is capable of focusing on registration of feature points in such a unit area.

In addition, for example, the list generation section 130 is also capable of continuously performing self-location identification related to a position Y from another position X where it is possible to acquire highly accurate positional information on the basis of the GPS by using a technology such as the SLAM, and the list generation section 130 is capable of inversely calculating reliability of respective feature points from the acquired error. In addition, at this time, it is also possible for the list generation section 130 to change a combination of feature points adopted in a same route, and perform the above-described process multiple times. In this case, the list generation section 130 is capable of inversely calculating reliability of the feature points in accordance with change in an error result depending on the combination of the adopted feature points.

On the other hand, in the case where the position error is the predetermined threshold ε or less (No in S1203), the list generation section 130 describes a local feature amount (S1205). Note that, here, the local feature amount according to the present embodiment may be a vector that describes how the feature point looks in an image. In other words, the local feature amount according to the present embodiment is represented by a vector that indicates a feature of a local region in the image.

In addition, at this time, the list generation section 130 may describe the local feature amount by using a feature amount extractor that uses a neural network. Here, the above-described feature amount extractor may be a learner that has undergone deep learning, reinforcement learning, or the like and acquired an ability of describing local feature amounts.

For example, the feature amount extractor is capable of acquiring an ability of describing local feature amounts by learning how to distinguish different feature amounts by using feature point data acquired all over the world. In addition, through the learning, the feature amount extractor is capable of absorbing differences in looks caused by change in an environment including lighting or the like, and is capable of describing feature amounts with high accuracy.

Note that, the learning using a neural network has been described above. However, the feature amount extractor according to the present embodiment is not limited thereto. The feature amount extractor according to the present embodiment may be a learner configured to find a law from a relation between input and output.

In addition, the list generation section 130 according to the present embodiment is also capable of describing the local feature amount by using a local descriptor, without using the feature amount extractor. In this case, the list generation section 130 may describe a local feature amount by using a local descriptor such as the SIFT or the SURF.

The details of recommendation feature point list generation according to the present embodiment have been described above. As described above, the list generation section 130 according to the present embodiment is capable of ranking feature points described in a feature point map, and registering a feature point having higher reliability in a recommendation feature point list.

<<2.8. Effect According to Present Embodiment>>

The details of functions of the information processing server 10 according to the present embodiment have been described above. As described above, the information processing server 10 according to the present embodiment is capable of selecting pieces of observation information to be used, on the basis of a target unit area and a target environment. In addition, the information processing server 10 is capable of generating a feature point map by using a piece of observation information corresponding to the target unit area and the target environment. In addition, the information processing server 10 is capable of ranking feature points described in the feature point map, and including a feature point having high reliability into a recommendation feature point list.

By using the above-described functions of the information processing server 10 according to the present embodiment, it is possible to reduce procedures related to self-localization performed by the information processing device 20, and it is possible to perform highly accurate self-localization. In addition, by using the recommendation feature point list according to the present embodiment, it is possible to perform stable self-localization based on feature amount information. In addition, by using the recommendation feature point list according to the present embodiment, it is also possible to facilitate reverse lookup of a recommendation feature point from a current position, and it is also possible to improve accuracy of control performed by the information processing device 20.

<<2.9. Self-Localization of Information Processing Device 20>>

Next, self-localization of the information processing device 20 according to the present embodiment will be described. As described above, the information processing device 20 according to the present embodiment is capable of performing self-localization by using a recommendation feature point list received from the information processing server 10.

Figure 16:
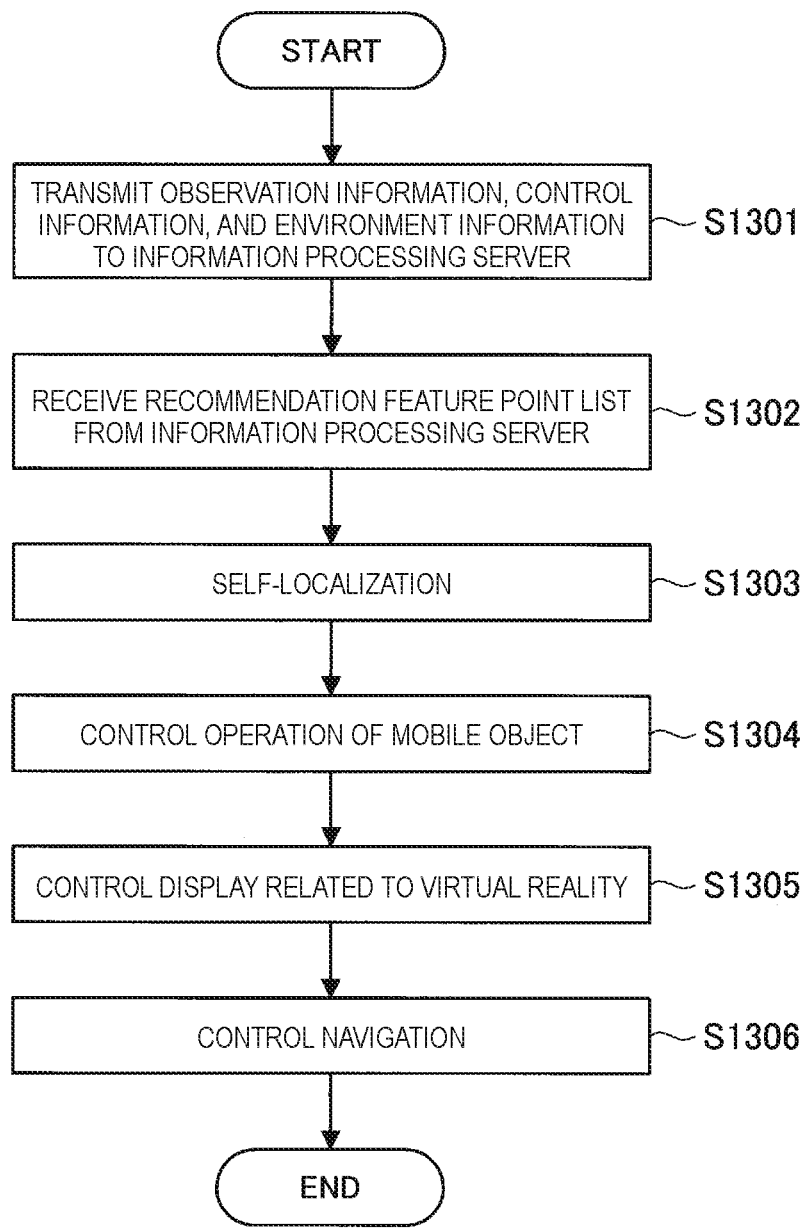
FIG. 16 is a flowchart illustrating a workflow of self-localization performed by the information processing device according to the embodiment.

Next, with reference to FIG. 16, a workflow of self-localization performed by the information processing devices 20 according to the present embodiment will be described. FIG. 16 is a flowchart illustrating the workflow of self-localization performed by the information processing device 20 according to the present embodiment.

With reference to FIG. 16, the server communication section 230 of the information processing device 20 first transmits the acquired observation information, control information, and environment information to the information processing server 10 (S1301). Here, the observation information may be information acquired from various sensors installed in the information processing device 20 or the mobile object 30. In addition, the control information may include speed information or steering information of the mobile object 30.

Next, the server communication section 230 receives a recommendation feature point list from the information processing server (S1302). At this time, the recommendation feature point list may be transmitted on the basis of the observation information or the like transmitted in Step S1301. In other words, the information processing device 20 is capable of acquiring the recommendation feature point list corresponding to a unit area and an environmental situation.

Next, the computation section 210 performs the self-localization by using the recommendation feature point list received in Step S1303 (S1303). At this time, the computation section 210 is capable of calculating a camera parameter including a three-dimensional position, attitude information, speed, acceleration, a triaxial rotation attitude, triaxial rotation speed, triaxial rotation acceleration, and the like.

Next, the function control section 220 performs various kinds of control on the basis of the camera parameter calculated in Step S1303. The information processing device 20 is capable of controlling operation of the mobile object 30 on the basis of the camera parameter (S1304).

In addition, the information processing device 20 is capable of controlling display related to virtual reality and augmented reality on the basis of the camera parameter (S1305).

In addition, the information processing device 20 is capable of performing control related to navigation on the basis of the camera parameter (S1306).

Note that, it is also possible to simultaneously execute the processes in Steps S1304 to S1306 described above. Alternatively, it is also possible for the information processing device 20 to execute any of the processes in Steps S1304 to S1306.

The workflow of self-localization of the information processing device 20 according to the present embodiment has been described above. Next, with reference to FIG. 17, input/output related to the computation section 210 of the information processing device 20 will be described.

Figure 17:
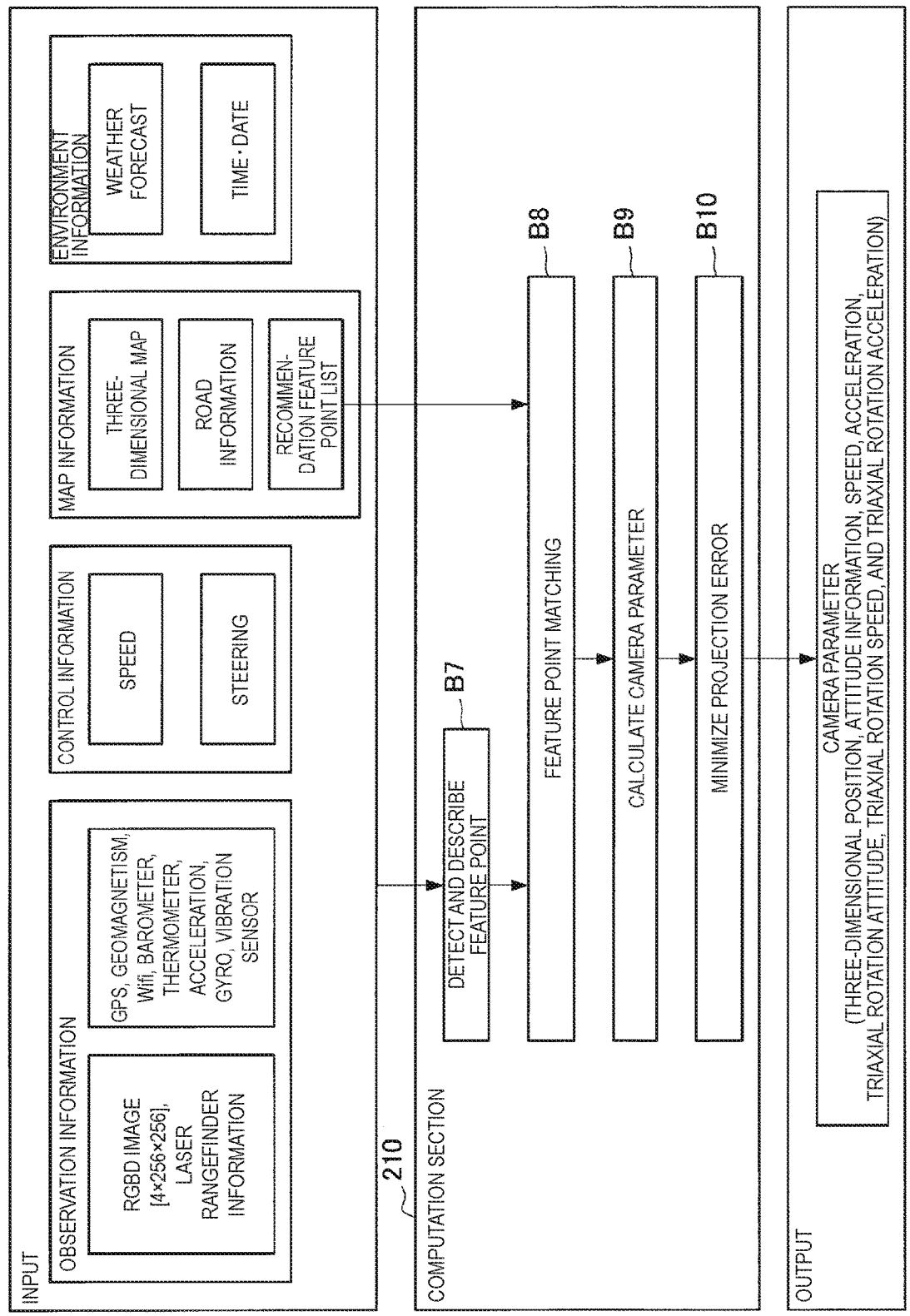
FIG. 17 is a conceptual diagram illustrating input/output related to a computation section according to the embodiment.

With reference to FIG. 17, it is understood that the computation section 210 according to the present embodiment outputs a camera parameter on the basis of various kinds of input information. At this time, the computation section 210 is capable of mapping feature points by using the recommendation feature point list acquired from the information processing server 10. Note that, the above-described parameter may include the various kinds of information described with reference to FIG. 16.

In addition, in FIG. 17, functions of the computation section 210 are provided with respective reference signs B7 to B10. In other words, the computation section 210 may include a feature point description function (B7), a feature point matching function (B8), a camera parameter calculation function (B9), and a projection error minimization function (B10). The functions B7 to B10 can be similar to the functions B2 to B5 described with reference to FIG. 12. Accordingly, repeated description will be omitted here.

The self-localization of the information processing device 20 according to the present embodiment has been described above. As described above, the information processing device 20 according to the present embodiment is capable of acquiring a recommendation feature point list corresponding to a unit area and an environmental situation. In addition, the information processing device 20 is capable of calculating a camera parameter by using the acquired recommendation feature point list. By using the above-described functions of the information processing device 20 according to the present embodiment, it is possible to reduce processing loads related to self-localization, and it is possible to perform self-localization with high accuracy.

<3. Hardware Configuration Example>

Figure 18:
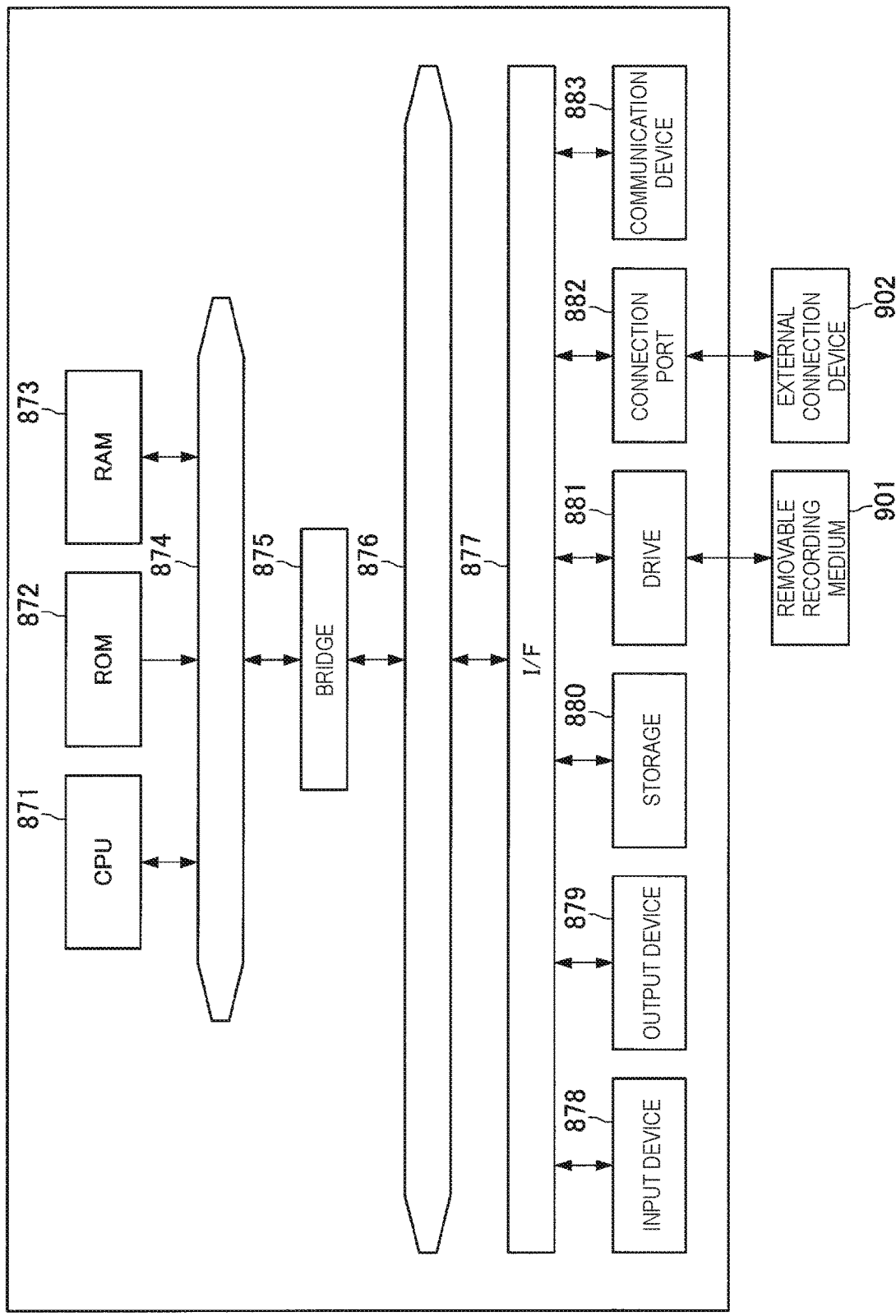
FIG. 18 is a hardware configuration example according to the present disclosure.

Next, a hardware configuration example that is common to the information processing server 10 and the information processing device 20 according to the present disclosure will be described. FIG. 18 is a block diagram illustrating the hardware configuration example of the information processing server 10 and the information processing device 20 according to the present disclosure. With reference to FIG. 18, for example, the information processing server 10 and the information processing device 20 each include a CPU 871, ROM 872, RAM 873, a host bus 874, a bridge 875, an external bus 876, an interface 877, an input device 878, an output device 879, a storage 880, a drive 881, a connection port 882, and a communication device 883. Note that, the hardware configuration illustrated here is an example. Some of the structural elements may be omitted. In addition, a structural element other than the structural elements illustrated here may be further added.

(CPU 871)

The CPU 871 functions as an arithmetic processing device or a control device, for example, and controls entire operation or a part of the operation of each structural element on the basis of various programs recorded on the ROM 872, the RAM 873, the storage 880, or a removable recording medium 901.

(ROM 872 and RAM 873)

The ROM 872 is a mechanism for storing a program to be loaded on the CPU 871, data used in an arithmetic operation, or the like. The RAM 873 temporarily or permanently stores, for example, a program to be loaded on the CPU 871, various parameters that arbitrarily changes in execution of the program, or the like.

(Host Bus 874, Bridge 875, External Bus 876, and Interface 877)

The CPU 871, the ROM 872, and the RAM 873 are interconnected with each other, for example, via the host bus 874 capable of high-speed data transmission. On the other hand, the host bus 874 is connected, for example, via the bridge 875, to the external bus 876 having comparatively low data transmission speed. In addition, the external bus 876 is connected with various structural elements via the interface 877.

(Input Device 878)

For example, as the input device 878, a mouse, a keyboard, a touchscreen, a button, a switch, a lever, or the like is used. In addition, as the input device 878, a remote controller (hereinafter, referred to as a remote) capable of transmitting a control signal by using infrared or other radio waves may be used.

(Output Device 879)

The output device 879 is, for example, a display device such as a cathode ray tube (CRT), an LCD, or an organic EL, an audio output device such as a speaker or headphones, or a device that can visually or audibly notify a user of acquired information such as a printer, a mobile phone, or a facsimile.

(Storage 880)

The storage 880 is a device for storing various kinds of data. As the storage 880, for example, a magnetic storage device such as a hard disk drive (HDD), a semiconductor storage device, an optical storage device, a magneto-optical storage device, or the like is used.

(Drive 881)

The drive 881 is a device for reading information recorded on the removable recording medium 901 and writing information on the removable recording medium 901. The removable storage medium 901 is, for example, a magnetic disk, an optical disk, a magneto-optical disk, a semiconductor memory, or the like.

(Removable Recording Medium 901)

The removable recording medium 901 is, for example, a DVD medium, a Blu-ray (registered trademark) medium, an HD-DVD medium, various types of semiconductor storage media, or the like. Of course, the removable recording medium 901 may be, for example, an electronic device, an IC card on which a non-contact IC chip is mounted, or the like.

(Connection Port 882)

The connection port 882 is, for example, a port for connecting an external connection device 902 such as a Universal Serial Bus (USB) port, an IEEE934 port, a Small Computer System Interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device used for a connection to a network. The communication device 883 may be, for example, a communication card for a wired or wireless LAN, Bluetooth (registered trademark) or a wireless USB (WUSB), a rooter for optical communication, a rooter for an asymmetric digital subscriber line (ADSL), or a modem for various kinds of communication.

<4. Conclusion>

As described above, the information processing server 10 according to the present disclosure is capable of selecting observation information to be used, on the basis of a target unit area and a target environment. In addition, the information processing server 10 is capable of generating a feature point map by using the observation information corresponding to the target unit area and the target environment. In addition, the information processing server 10 is capable of ranking feature points described in the feature point map, and including a feature point having high reliability into a recommendation feature point list. In addition, the information processing device 20 according to the present disclosure is capable of acquiring a recommendation feature point list corresponding to a unit area and an environmental situation. In addition, the information processing device 20 is capable of calculating a camera parameter by using the acquired recommendation feature point list. According to such configurations, it is possible to provide positional information with higher accuracy in accordance with situations in the real world.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing method including:

generating, by a processor, a feature point list in which three-dimensional coordinates of a feature point are associated with a local feature amount of the feature point, the feature point having been detected from observation information collected around a unit area.

(2)

The information processing method according to (1), in which generation of the feature point list further includes generation of the feature point list associated with environment information.

(3)

The information processing method according to (2), in which the environment information includes information related to at least any of weather, a lighting environment, an atmospheric state, time, and a date.

(4)

The information processing method according to any of (1) to (3), in which generation of the feature point list further includes generation of a feature point list in which the feature points are ranked per unit area.

(5)

The information processing method according to (4), in which generation of the feature point list further includes the ranking based on at least one of projection errors of the feature points and positional errors related to observation points of the observation information.

(6)

The information processing method according to (4) or (5), in which the generation of the feature point list further includes the ranking based on a number of pieces of observation information related to the feature points (7)

The information processing method according to any of (4) to (6), in which generation of the feature point list further includes the ranking based on a number of pieces of observation information related the feature points observed in another unit area near the unit area used for generating the feature point list.

(8)

The information processing method according to any of (1) to (7), in which the unit area includes an area in an indoor space.

(9)

The information processing method according to any of (1) to (7), in which generation of the feature point list further includes generation of the feature point list related to a unit area selected on a basis of at least any of map information, a traffic history, and a walking history.

(10)

The information processing method according to any of (1) to (9), further including transmitting the feature point list to an information processing device on a basis of a request from the information processing device.

(11)

An information processing device including:

a computation section configured to extract a feature point and a local feature amount related to the feature point from acquired image information: and a communication section configured to acquire a feature point list on a basis of collected observation information, in which the computation section performs self-localization on a basis of the local feature amount and the feature point list, and the feature point list includes the local feature amount related to the feature point and a three-dimensional coordinate position of the feature point associated with a unit area including an observation point of the observation information.

(12)

The information processing device according to (11), in which the communication section acquires the feature point list further on a basis of collected environment information, and the feature point list is a feature point list associated with the environment information.

(13)

The information processing device according to (11) or (12), in which the computation section calculates a camera parameter of an imaging section that has acquired the image information, and the camera parameter includes at least any of a three-dimensional coordinate position, attitude information, speed, acceleration, a triaxial rotation attitude, triaxial rotation speed, and triaxial rotation acceleration.

(14)

The information processing device according to (13), further including an operation control section configured to control operation of a mobile object on a basis of the camera parameter.

(15)

The information processing device according to (13) or (14), further including a display control section configured to control display related to at least any of virtual reality and augmented reality on a basis of the camera parameter.

(16)

The information processing device according to any of (13) to (15), further including a navigation section configured to conduct route navigation related to a mobile object on a basis of the camera parameter.

(17)

An information processing device including:

a communication section configured to receive observation information collected around a unit area; and a list generation section configured to generate a feature point list in which three-dimensional coordinates of a feature point are associated with a local feature amount of the feature point, the feature point having been detected from the observation information.

REFERENCE SIGNS LIST 10 information processing server
110 data selection section
120 feature point extraction section
130 list generation section
140 device communication section
20 information processing device
210 computation section
220 function control section
230 server communication section
30 mobile object
40 network

The invention claimed is:

1. An information processing method comprising:
generating, by a processor, a feature point list in which three-dimensional coordinates of each feature point of a plurality of feature points are associated with a local feature amount of the feature point, each feature point of the plurality of feature points having been detected from observation information collected around a unit area,
wherein the feature point list is generated according to a reliability of each feature point of the plurality of feature points, and
wherein the reliability of each feature point is determined according to time information related to the observation information, the time information indicating one or more times when each feature point was detected from the observation information.

2. The information processing method according to claim 1, wherein
the reliability of each feature point is further determined according to environment information.

3. The information processing method according to claim 2, wherein
the environment information includes information related to at least one of weather, a lighting environment, an atmospheric state, or a date.

4. The information processing method according to claim 1, wherein
the feature point list is further generated such that the plurality of feature points are ranked per unit area.

5. The information processing method according to claim 4, wherein
the ranking of the plurality of feature points is based on at least one of projection errors of the plurality of feature points or positional errors related to observation points of the observation information.

6. The information processing method according to claim 4, wherein
includes the ranking of the plurality of feature points is based on a number of pieces of observation information related to the plurality of feature points.

7. The information processing method according to claim 4, wherein
the ranking of the plurality of feature points is based on a number of pieces of observation information related to one or more feature points observed in another unit area near the unit area used for generating the feature point list.

8. The information processing method according to claim 1, wherein
the unit area includes an area in an indoor space.

9. The information processing method according to claim 1, wherein
the feature point list is generated according to at least one of map information, a traffic history, or a walking history.

10. The information processing method according to claim 1, further comprising:
transmitting the feature point list to an information processing device on a basis of a request received from the information processing device.

11. An information processing device comprising:
a computation section configured to extract a plurality of feature points and a local feature amount related to each feature point of the plurality of feature points from acquired image information; and
a communication section configured to acquire a feature point list on a basis of collected observation information,
wherein the computation section performs self-localization on a basis of the local feature amount and the feature point list,
wherein the feature point list includes the local feature amount related to each feature point of the plurality of feature points and a three-dimensional coordinate position of each feature point associated with a unit area including an observation point of the observation information,
wherein the acquired feature point list is generated according to a reliability of each feature point of the plurality of feature points,
wherein the reliability of each feature point is determined according to time information related to the observation information, the time information indicating one or more times when each feature point was detected from the observation information, and
wherein the computation section and the communication section are each implemented via at least one processor.

12. The information processing device according to claim 11, wherein
the communication section acquires the feature point list further on a basis of collected environment information, and
the feature point list is associated with the environment information.

13. The information processing device according to claim 11, wherein
the computation section calculates a camera parameter of an imaging section that has acquired the image information, and
the camera parameter includes at least one of a three-dimensional coordinate position, attitude information, speed, acceleration, a triaxial rotation attitude, triaxial rotation speed, or triaxial rotation acceleration.

14. The information processing device according to claim 13, further comprising:
an operation control section configured to control operation of a mobile object on a basis of the camera parameter,
wherein the operation control section is implemented via at least one processor.

15. The information processing device according to claim 13, further comprising:
a display control section configured to control display related to at least one of virtual reality or augmented reality on a basis of the camera parameter,
wherein the display control section is implemented via at least one processor.

16. The information processing device according to claim 13, further comprising:
a navigation section configured to conduct route navigation related to a mobile object on a basis of the camera parameter,
wherein the navigation section is implemented via at least one processor.

17. An information processing device comprising:
a communication section configured to receive observation information collected around a unit area; and
a list generation section configured to generate a feature point list in which three-dimensional coordinates of each feature point of a plurality of feature points are associated with a local feature amount of the feature point, each feature point of the plurality of feature points having been detected from the observation information,
wherein the feature point list is generated according to a reliability of each feature point of the plurality of feature points,
wherein the reliability of each feature point is determined according to time information related to the observation information, the time information indicating one or more times when each feature point was detected from the observation information, and
wherein the communication section and the list generation section are each implemented via at least one processor.

18. The information processing method according to claim 1, wherein
the reliability of each feature point is further determined according to weather information related to the observation information.

* * * * *